United States Patent
Waller

(10) Patent No.: US 12,354,349 B2
(45) Date of Patent: Jul. 8, 2025

(54) IMAGE MANAGEMENT WITH REGION-BASED METADATA INDEXING

(71) Applicant: Rewyndr, LLC, Pittsburgh, PA (US)

(72) Inventor: Craig Waller, Sewickley, PA (US)

(73) Assignee: Rewyndr, LLC, Pittsburgh, PA (US)

( * ) Notice: Subject to any disclaimer, the term of this patent is extended or adjusted under 35 U.S.C. 154(b) by 643 days.

(21) Appl. No.: 17/274,467

(22) PCT Filed: Sep. 9, 2019

(86) PCT No.: PCT/US2019/050179
§ 371 (c)(1),
(2) Date: Mar. 9, 2021

(87) PCT Pub. No.: WO2020/055733
PCT Pub. Date: Mar. 19, 2020

(65) Prior Publication Data
US 2022/0050867 A1 Feb. 17, 2022

Related U.S. Application Data

(60) Provisional application No. 62/729,415, filed on Sep. 10, 2018, provisional application No. 62/729,416, (Continued)

(51) Int. Cl.
*G06F 16/583* (2019.01)
*G06F 3/04842* (2022.01)
(Continued)

(52) U.S. Cl.
CPC .......... *G06V 20/30* (2022.01); *G06F 3/04842* (2013.01); *G06F 16/51* (2019.01);
(Continued)

(58) Field of Classification Search
CPC ........ G06V 20/30; G06V 20/20; G06V 20/70; G06V 10/768; G06V 2201/10;
(Continued)

(56) References Cited

U.S. PATENT DOCUMENTS 8,849,945 B1 * 9/2014 Desjardins ............. G11B 27/34
725/35
9,953,242 B1 4/2018 Tyagi et al.
(Continued)

FOREIGN PATENT DOCUMENTS

JP H09160742 A 6/1997
JP 2001521250 A 11/2001
(Continued)

OTHER PUBLICATIONS

Young, Lee, International Search Report (ISR) and Written Opinion of the International Searching Authority, PCT/US19/50179, (14 pages), Dec. 11, 2019.
(Continued)

*Primary Examiner* — Ken Hoang
(74) *Attorney, Agent, or Firm* — Gabriel & Co; Andrew M. Gabriel

(57) ABSTRACT

An embodiment provides a method, including: receiving, from a device, a user identification; storing, in a storage device, first data produced by first free-form user input specifying one or more regions of an image and second data comprising second free-form user input describing the one or more regions of the image; each first data having corresponding second data stored in association therewith; selecting, using a processor, a data set comprising at least a portion of the first data and the second data based at least in part on the user identification; and providing the selected data set for display. Other embodiments are described and claimed.

15 Claims, 15 Drawing Sheets

Related U.S. Application Data filed on Sep. 10, 2018, provisional application No. 62/729,414, filed on Sep. 10, 2018, provisional application No. 62/729,411, filed on Sep. 10, 2018.

(51) Int. Cl.
| | | |
|---|---|---|
| *G06F 16/51* | (2019.01) | |
| *G06F 16/53* | (2019.01) | |
| *G06V 10/70* | (2022.01) | |
| *G06V 20/20* | (2022.01) | |
| *G06V 20/30* | (2022.01) | |
| *G06V 20/70* | (2022.01) | |
| *G06F 3/14* | (2006.01) | |
| *G06F 3/16* | (2006.01) | |

(52) U.S. Cl.
CPC .......... *G06F 16/53* (2019.01); *G06F 16/5854* (2019.01); *G06V 10/768* (2022.01); *G06V 20/20* (2022.01); *G06V 20/70* (2022.01); *G06F 3/1454* (2013.01); *G06F 3/167* (2013.01); *G06V 2201/10* (2022.01)

(58) Field of Classification Search
CPC ...... G06F 16/5854; G06F 16/53; G06F 16/51; G06F 3/04842; G06F 3/1454; G06F 3/167

See application file for complete search history.

(56) References Cited

U.S. PATENT DOCUMENTS

| | | | | |
|---|---|---|---|---|
| 10,296,713 | B2* | 5/2019 | Brabec | G16H 30/40 |
| 10,606,941 | B2* | 3/2020 | Biran | G06F 3/04842 |
| 10,726,081 | B2* | 7/2020 | Perkins | G06F 16/951 |
| 11,080,838 | B1* | 8/2021 | Li | G06T 7/0002 |
| 11,355,242 | B2* | 6/2022 | Sailer | G06F 16/953 |
| 2005/0080818 | A1 | 4/2005 | Kindberg | |
| 2007/0196033 | A1 | 8/2007 | Russo | |
| 2010/0082677 | A1* | 4/2010 | Athsani | G06F 16/907 |
| | | | | 707/783 |
| 2010/0228751 | A1 | 9/2010 | Oh | |
| 2010/0241946 | A1* | 9/2010 | Ofek | G06F 16/583 |
| | | | | 715/231 |
| 2011/0158558 | A1 | 6/2011 | Zhao | |
| 2011/0182493 | A1 | 7/2011 | Huber | |
| 2012/0092357 | A1 | 4/2012 | Wang | |
| 2013/0013578 | A1 | 1/2013 | Geng | |
| 2013/0293468 | A1 | 11/2013 | Perez | |
| 2015/0178320 | A1 | 6/2015 | Gao et al. | |
| 2016/0018886 | A1* | 1/2016 | Song | G06F 3/017 |
| | | | | 715/757 |
| 2017/0235903 | A1* | 8/2017 | McLaughlin | G01S 7/52084 |
| | | | | 715/708 |
| 2017/0308751 | A1 | 10/2017 | Kim | |
| 2017/0315974 | A1 | 11/2017 | Kong et al. | |
| 2018/0137119 | A1 | 5/2018 | Li | |

FOREIGN PATENT DOCUMENTS

| | | |
|---|---|---|
| JP | 2007018456 A | 7/2005 |
| JP | 2009070201 A | 4/2007 |
| JP | 2010118019 A | 5/2010 |
| JP | 2012094138 A | 5/2012 |
| JP | 2013235005 A | 11/2013 |
| JP | 2014123260 A | 7/2014 |
| JP | 2016055048 A | 4/2016 |
| JP | 2016201135 A | 12/2016 |
| WO | 2017104043 A1 | 6/2017 |
| WO | 2018152685 A1 | 8/2018 |

OTHER PUBLICATIONS

Anonymous: "Augmented reality-based testing—Wikipedia," Nov. 30, 2016, XP093182307, Retrieved from https://web.archive.org/2016130161509/https://en.wikipedia.org/wiki/Augmented_reality-based_testing (2016), 3 pages.

Webel Sabine et al., "An augmented reality training platform for assembly and maintenance skills," Robotics and Autonomous Systems, 2012, 10 pages.

Suzuki, Office Action in Japanese Patent Application No. 2024-077098, Apr. 21, 2025, 12 pages (including translation).

* cited by examiner

| User ID | Photo ID | Region ID | Description ID | Description | N |
|---------|----------|-----------|----------------|-------------|---|
| User A  | 1234     | 001       | 001            | Text A      |   |
| User B  | 1234     | 001       | 002            | Audio A     |   |

| | | | |
|---|---|---|---|
| E1. | Time of day? _____ | | Age in photo? _____ |
| | Season? _____ | | DOB? _____ |
| | Event? _____ | | M/F? _____ |
| | Photographer? _____ | | Relation to N1? _____ |
| | Date _____ | | Relation to N2? _____ |
| L1. | City? _____ | | Relation to N4? _____ |
| | State? _____ | | Trade/Profession? _____ |
| | Country? _____ | | Employer(s)? _____ |
| | Zip Code? _____ | | School(s)? _____ |
| I1. | Name? _____ | I4. | Name? _____ |
| | Nickname(s)? _____ | | Nickname(s)? _____ |
| | Age in photo? _____ | | Age in photo? _____ |
| | DOB? _____ | | DOB? _____ |
| | M/F? _____ | | M/F? _____ |
| | Relation to N2? _____ | | Relation to N1? _____ |
| | Relation to N3? _____ | | Relation to N2? _____ |
| | Relation to N4? _____ | | Relation to N3? _____ |
| | Trade/Profession? _____ | | Trade/Profession? _____ |
| | Employer(s)? _____ | | Employer(s)? _____ |
| | School(s)? _____ | | School(s)? _____ |
| I2. | Name? _____ | R1. | Route Name? _____ |
| | Nickname(s)? _____ | | Route Type? _____ |
| | Age in photo? _____ | S1. | Structure Type? _____ |
| | DOB? _____ | | Structure Name? _____ |
| | M/F? _____ | | Structure Address? _____ |
| | Relation to N1? _____ | | Structure Owner? _____ |
| | Relation to N3? _____ | S2. | Structure Type? _____ |
| | Relation to N4? _____ | | Structure Name? _____ |
| | Trade/Profession? _____ | | Structure Address? _____ |
| | Employer(s)? _____ | | Structure Owner? _____ |
| | School(s)? _____ | T1. | Thing Type? _____ |
| I3. | Name? _____ | | Thing Name? _____ |
| | Nickname(s)? _____ | | Custom content field? _____ |

FIG. 8

IMAGE MANAGEMENT WITH REGION-BASED METADATA INDEXING

CROSS REFERENCE TO RELATED APPLICATIONS

This application claims priority to the following U.S. provisional patent applications, each of which was filed on Sep. 10, 2018, the contents of which are incorporated by reference herein: Ser. No. 62/729,411, entitled "SYSTEM AND METHOD FOR IMAGE CONTENT AND CONTEXT IDENTIFICATION, COLLABORATION AND MANAGEMENT," Ser. No. 62/729,416, entitled "COMMUNITY BASED AUGMENTED IMAGE SYSTEM WITH ENHANCED PHOTO CONTENT," Ser. No. 62/729,415, entitled "COMMUNITY BASED MEMORY REFLECTION SYSTEM WITH ENHANCED PHOTO CONTENT," and Ser. No. 62/729,414, entitled "PHOTO MANAGEMENT SYSTEM WITH OBJECT BASED IDENTIFICATION INDEX UTILIZING EMBEDDED METADATA."

BACKGROUND

In today's digital age where instant digital image capture is the norm, there are many digitized images that are stored in an unorganized fashion in widely disparate locations. Many images were created in the past century or more recently using standard photographing equipment. In some cases, a physical photo is the only medium that remains capturing the scene and/or people represented in the image. Unfortunately, even if digitized, various media storage and sharing networks, many of which are accessible via the Internet (e.g., content storage networks, social networks, etc.), have very limited information that may be associated with these images apart from the filename itself and a file folder to which the images may belong. In some cases, such as social media networks, some rudimentary metadata, such as face tagging and geo-tagging, may provide a limited description of the image or its contents.

SUMMARY

The subject matter described herein relates information indexing for images and regions thereof. The subject matter relates to an image management system and related methods and products designed to index information for images by specific regions, e.g., specific pixels, so that each region or area of the image can be associated with detailed information.

The foregoing is a summary and is not intended to be in any way limiting. For a better understanding of the example embodiments, reference can be made to the detailed description and the drawings. The scope of the invention is defined by the claims.

BRIEF DESCRIPTION OF THE DRAWINGS

FIG. 8 illustrates an example of content identifier groupings for an image.

DETAILED DESCRIPTION

It will be readily understood that the components of the example embodiments, as generally described and illustrated in the figures herein, may be arranged and designed in a wide variety of different configurations in addition to the described and illustrated examples. Thus, the following detailed description is not intended to limit the scope of the claims, but is merely representative of selected example embodiments. The appearances of the phrase "in an embodiment" or the like in various places throughout this specification do not necessarily refer to the same embodiment. Furthermore, the described features, structures, or characteristics may be combined in any suitable manner in one or more embodiments. In the following description, numerous specific details are provided to give a thorough understanding; however, one skilled in the relevant art will recognize that various embodiments can be practiced without one or more of the specific details, or with other methods, components, materials, etc. In other instances, well-known structures, materials, or operations are not shown or described in detail to avoid obscuring other aspects of the embodiments.

Existing image management systems rely on limited labels for images or image parts that are selected, often by a single user, from among predetermined, fixed categories. Conventional approaches therefore result in images that have limited descriptions. Software dedicated to image labelling provides tools for adding labels to image parts; however, such software is dedicated to labelling, is overly complex, and is incompatible with other, non-labeling applications. These shortcomings of the current approaches used to store and manage images result in suboptimal image search and retrieval, and limits the usefulness of images in a variety of contexts, e.g., industrial training, auditing, and like applications. Further, existing approaches limit the granularity with which images and associated metadata can be secured and presented to specific users.

Figure 1:
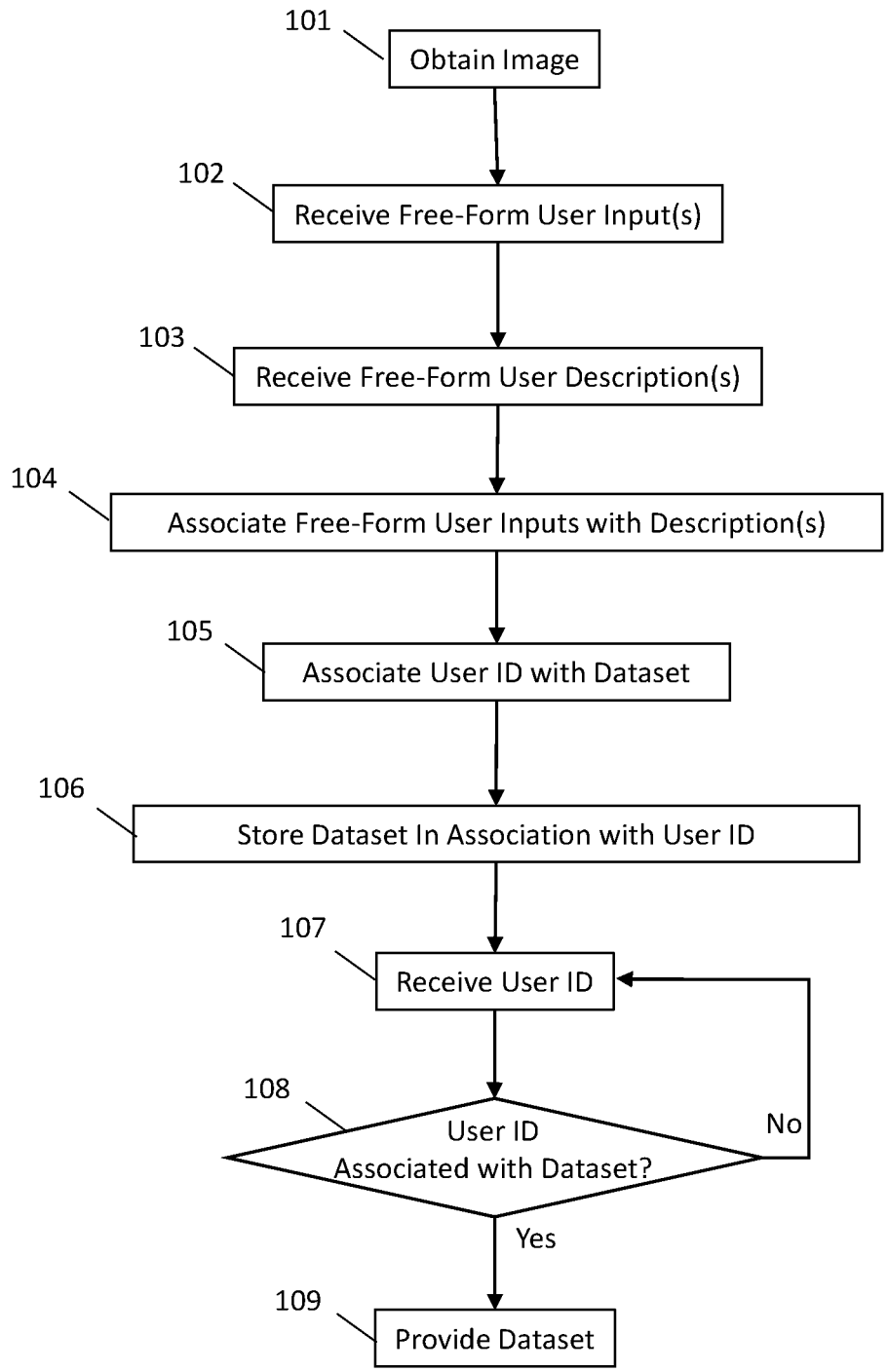
FIG. 1 illustrates an example method of creating, storing and providing images and associated metadata.

Referring to FIG. 1, an embodiment provides a method for creating, storing and retrieving image and region-specific metadata. As described herein, the region-specific metadata associated with the image permits a variety of uses for images not currently possible.

Figure 2:
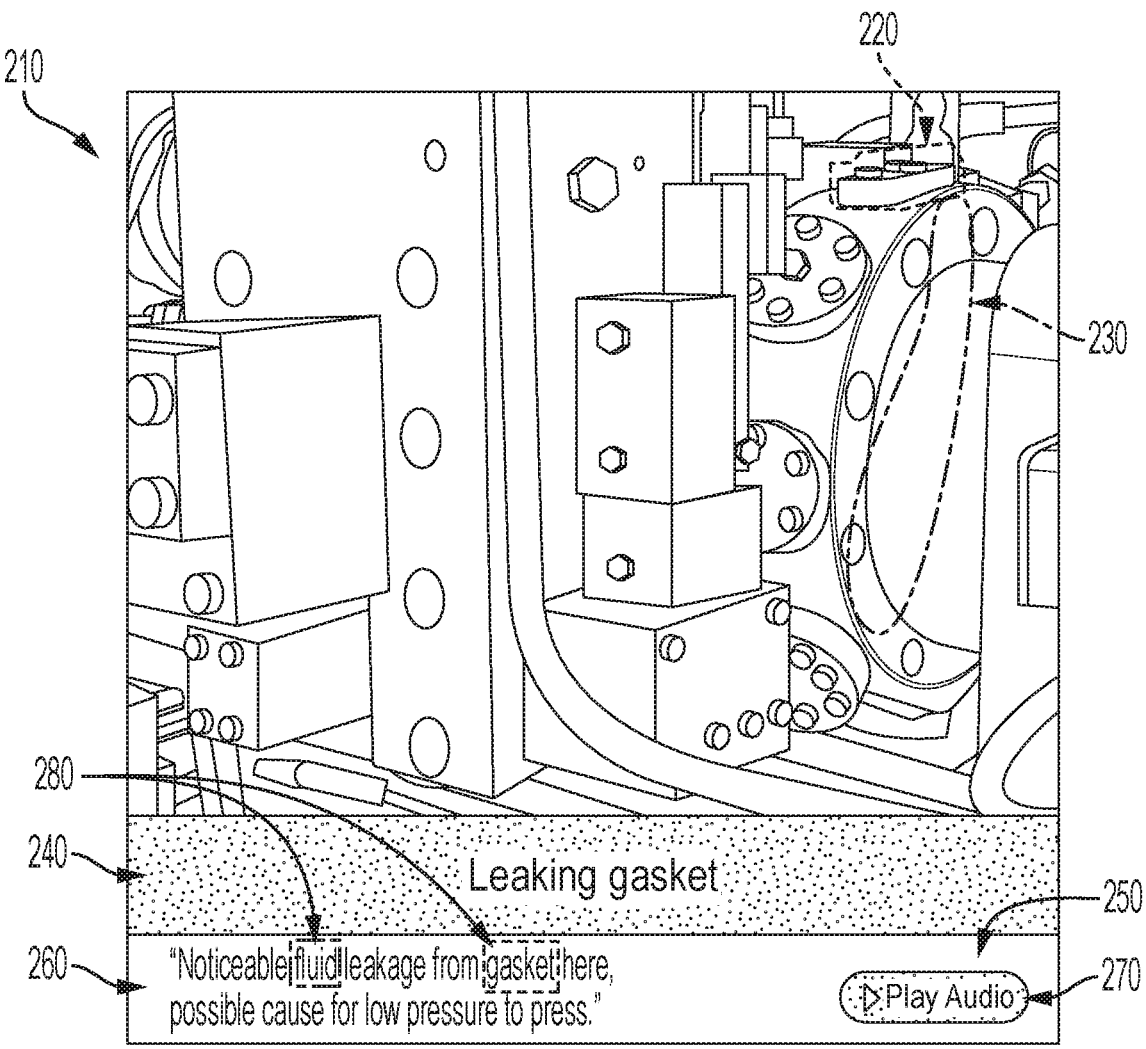
FIG. 2 illustrates an example image and associated free-form user inputs.

In the example of FIG. 1, an image is obtained at 101, e.g., captured using a device such as a smart phone with a digital camera. Thereafter, a user interface is provided for a user to input region selection(s), received at 102, and descriptions, received at 103. Referring briefly to FIG. 2, it will be appreciated that free-form user inputs 220, 230, 240, 260 and 270 may be supplied by the user in the form of image region selections (220, 230) and region descriptions (240, 260, 270). The user inputs are free-form in that they are not predetermined, i.e., the user may select any part of the image using a free-form input type such as selections 220, 230, provided via touch input on a touch screen, highlighting using a mouse input device, etc.

In an embodiment, the image obtained at 101 may undergo image processing, e.g., prior to a user to supplying the free-form user inputs at 102. For example, an image captured at 101 may undergo object detection (bounding box placement) and/or object recognition or identification (generic or custom labeling of the object identified in the bounding box using artificial intelligence or machine learning). These automated steps, e.g., object detection and/or object recognition, may be used in assisting the user in creating the free-form user inputs at 102. For example, an embodiment may suggest a location for a region selection based on object detection.

Likewise, the region descriptions 240, 260, 270 are free-form in that they are not restricted to a specific category or format, i.e., the user may input any description for the region using text, audio, image, hyperlink, or a combination of these input types. Again, automated processing may be applied to assist the user in supplying region descriptions. For example, object identification by artificial intelligence may be used to supply a suggested label or category (optionally including sub-categories) to assist the user in creating free-form user inputs in the form of descriptive text or audio, as further described herein.

Referring again to FIG. 1, an embodiment associates the free-form user inputs (selecting the regions, e.g., regions 220, 230 of FIG. 2), with the free-form descriptions, e.g., descriptions 240, 260, 270 of FIG. 2, as indicated at 104. This association may be automated or semi-automated. For example, an embodiment may respond to a user's selection of an image region, e.g., drawing an outline in the form of 220 of FIG. 2, with activation of a description input area, e.g., title area 240 or free-form description area 250 (text or audio input area), such that the descriptive input 260, 270 is stored in association with the selected regions 220, 230. Further, an embodiment can associate at 104 multiple regions with the same description (or parts thereof), as well as enter multiple descriptions for a given region. By way of example, a user may provide two region selections, e.g., selections 220, 230 of FIG. 2, and associate parts of the same descriptive text 260 with the regions specifically. This association may be indicated in a display interface, e.g., via use of differential color highlighting, collectively indicated at 280 in this example.

In an embodiment, the association may result from presentation and/or storage of region-specific content identifier groupings, which associate user supplied data entries, e.g., text data entries, with regions of the image in an organized manner, as described in the example illustrated in FIG. 8. Therefore, the descriptive data (e.g., text, audio, or image data), or part thereof, is associated with a specific region of the image, e.g., specific pixel coordinates of the image. The specific regions of the image are, for example, pixels of the image selected by the user, such as those bounded by the user inputs 220 or 230, which are logically associated with the description(s), e.g., free-form descriptions 260, 270.

By permitting the specification of regions and associated descriptive metadata for the image, many practical embodiments may be formed. For example, as indicated at 105, a user may associate a user ID with an image and descriptive metadata to form a dataset. The dataset may include the image, one or more of the regions, and one or more of the descriptive metadata entries, or a suitable combination of the foregoing. The user ID may be associated, as indicated at 105, directly with a dataset, i.e., a user ID (such as a username and password pair) permits direct access to the dataset, or indirectly, i.e., a user ID allows association with a role permitted access to the dataset. In other examples, the user ID is inferred, e.g., from a domain, network address, geographic location, or other credential or identifying information. The association of the user ID (broadly understood) with the dataset is stored at 106 for later use, e.g., differential retrieval of image and metadata as datasets for various applications, as described further herein. In the example of FIG. 1, a user ID is received at 107 and this user ID is used to determine if an association has been stored for this user ID in terms of a dataset at 108. If so, the dataset is provided at 109. Otherwise, the dataset is not provided and the user can again attempt to enter a user ID or the process may end.

Figures 6, 7:
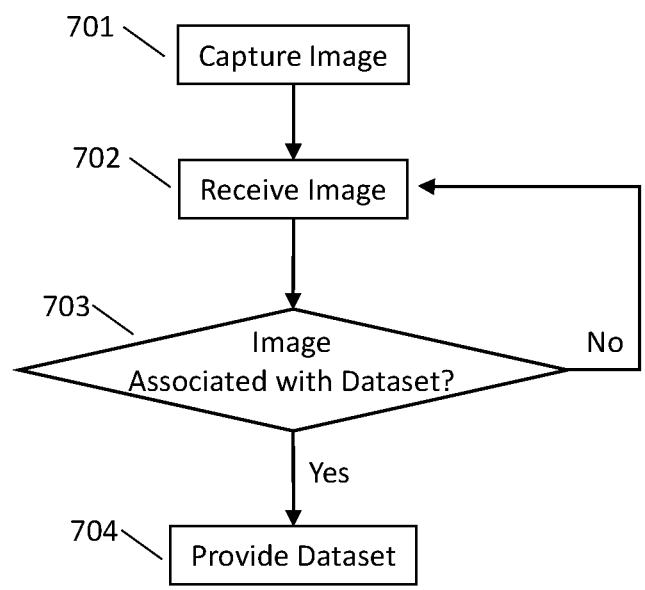
FIG. 6 illustrates an example of an expandable storage structure.
FIG. 7 illustrates an example of providing region-specific datasets for augmented reality.

By way of specific example, illustrated in FIG. 2 is a dataset including an image 210, displayed for example in a device screen such as on a tablet or smartphone, provided in response to input of a user ID or other identification data (e.g., image identifier, as further described herein with respect to FIG. 7). The image 210 is associated with metadata such that it is displayed in association with highlighted regions 220, 230, as well as free-form descriptive metadata in a title area 240 ("Leaking gasket") and descriptive area 250, containing descriptive text 260 and descriptive audio 270 in this example. The descriptive area 250 displays descriptive text 260 that is color coded 280 to match regions 220, 230, respectively.

In an embodiment, the dataset that is provided, e.g., at 109 of FIG. 1, is dependent on the user ID rather than the image. For example, a user ID may be associated at 105 with less than all of the region selections 220, 230 or less than all of the descriptive metadata 260, 270. By way of specific example, a first user ID may be associated with each of the regions 220, 230 such that each is displayed as highlighted when the image is displayed for that user. However, the first user ID may be restricted to just the textual description 260. A second user ID, on the other hand, may be associated with both regions 220, 230 and both of the free-form descriptions 260, 270, i.e., the second user ID may also have access to and be provided with the audio input 270 (e.g., a link to an audio file). This imparts a granularity to the types and amount of data that are returned with the image, e.g., based on user ID. As will be readily understood by those having ordinary skill in the art, this granularity has many possible applications, e.g., restricting access to technological data associated with an image of machinery based on user role, restricting access to personally identifying information associated with images of people based on group membership, filtering and surfacing certain information based on user interest in response to a search query, etc.

Figure 3:
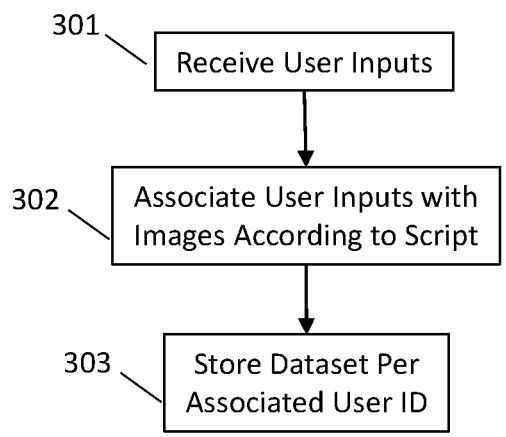
FIG. 3 illustrates an example of providing a scripted dataset.

An example use of this detailed image and metadata, referring to FIG. 3, includes a user scripting an image-focused program, such as an industrial training or auditing process. As shown, a user can provide inputs to annotate regions of an image, which are received at 301, similar to those outlined in the example of FIG. 2, e.g., inputs 220, 230, 260, 270. For example, an expert mechanic may supply touch screen inputs to highlight or circle areas 220, 230 of an image of a machine with a leaking gasket that is to be repaired. Further, after providing one or more of the inputs to highlight or circle areas 220, 230, the user may provide descriptions of these regions, e.g., a textual description of a leaking gasket pictured in the image in region 220, and specifying that a fluid leak is visible in region 230.

For each such image that is part of a dataset, e.g., an industrial training set, the user can associate region-specific selections and descriptions with the training images according to a script, as illustrated at 302. The scripting process may be semi-automated, i.e., a user can be guided with suggestions for including specific images and descriptions in the scripted training program. For example, an embodiment may prompt a user to capture a first image that shows the leaking gasket, and prompt the user to provide an indication of the leaking gasket's location and any leaking fluids included in the image along with appropriate descriptions thereof. Similarly, a training or maintenance script may be filled out by the user such that a second image shows an area of the machine at which the user providing maintenance (to replace the leaking gasket) can turn off the machine, a third image shows a tool applied to the area of the machine to expose the leaking gasket, a fourth image shows the application of a new gasket, a fifth image show the reassembling of the machine about the new gasket, etc., each with appropriate regions highlighted and containing associated descriptions. Thus, a scripted, image-focused training program may be formed using an embodiment.

As described herein, the scripted program thus formed may be associated with the appropriate user IDs, as illustrated at 303. For example, the user creating the training or maintenance program may associate user IDs by assigning the training program to a role or community of users, such that these users can access the training program and related datasets. Other such scripted programs are possible. For example, a scripted, image-focused auditing dataset may be created that requires a user to capture (and optionally annotate) images as part of a script. This auditing dataset can be assigned to specific users, stored in a cloud storage location, and accessed by other users, e.g., managers, to ensure compliance with required procedures. Other scripted programs are of course possible, e.g., scripted slide shows for social or educational presentations, and the like.

Figure 4:
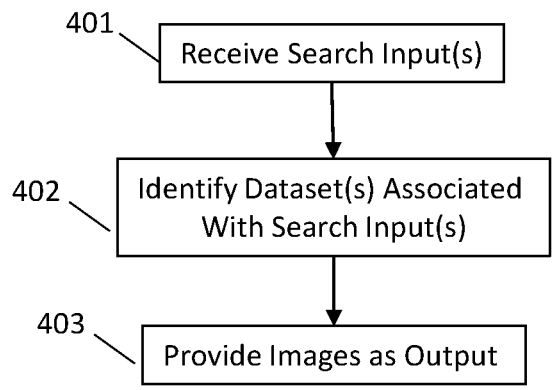
FIG. 4 illustrates an example of providing a metadata assisted image search.

As illustrated in FIG. 4, an embodiment permits users to more easily describe images using region-specific descriptions, which in turn can be utilized to facilitate improved search querying, image collection, and result processing. The collection and organization of the descriptions in association with the image regions leads to unique image signatures that facilitate such applications.

With respect to image searching, an embodiment receives one or more search inputs, indicated at 401, which are flexible given the rich datasets associated with the images. For example, because the image regions are associated with descriptive text (directly or indirectly), this permits a user to search using text inputs of keywords a user believes describes data of interest or via selection of region(s) of a photo that is/are of interest. In the region selection example, an embodiment associates the region selection(s) with set(s) of descriptive terms that are used for searching.

At 402, an embodiment identifies datasets associated with the search input(s). In an embodiment, the identification performed at 402 is facilitated by utilizing the descriptive metadata for the region(s) of the images. By way of example, because a user has previously described an image of a specific scene, for example as illustrated in FIG. 8, this allows a search query including text inputs related to objects included in that scene, e.g., a person name, a street name, a city name, etc., to return the image. Additionally, if a user selects a region of an image, e.g., selection of a person included in an image, an embodiment may use that region selection to identify search terms, e.g., the person's name included in the descriptive metadata for that region, to search for and return other image(s) that also include that person.

An embodiment may expand the searchable terms indexed with the images using a variety of techniques. For example, if a user has included audio input as descriptive metadata for an image region, an embodiment may transcribe the audio to text by using natural language processing, converting the descriptive audio input into searchable text. An embodiment may also use word-expansion techniques to generalize the descriptions, e.g., include synonyms for descriptive terms included by a user in the descriptive metadata text.

An embodiment may also employ an artificial intelligence program to learn three-dimensional (3D) models of objects using the descriptive metadata. For example, an embodiment may utilize images sharing the same region-specific descriptions to learn that various images (or regions thereof) are of the same object, e.g., images of the same object taken at different angles. By way of specific example, if one or more users capture images of the same object, e.g., a machine, and each labels the regions containing the machine using the same or similar descriptive metadata, an embodiment will associate these image regions based on the descriptive metadata. Depending on the number of images and the accuracy with which the region containing the object (e.g., machine or part thereof) is specified, an embodiment can learn a 3D model of the object's shape over time. This permits an embodiment to utilize this 3D model data to identify the object, e.g., in an unlabeled image, and to perform other functionality, e.g., supplying a virtual representation of the object in a virtual or augmented reality display based on the learned 3D model of the object.

In this regard, an embodiment may assist users in accurately indicating a region of the image for addition of region-specific metadata descriptions. In an embodiment, regions may be predefined, e.g., using a grid system, where a user supplies free-form, region-specific metadata by selecting the appropriate grid regions (e.g., squares, auto-detected object bounding boxes, etc.) within the image. As described herein, an embodiment permits free-form inputs to be supplied by manual input, e.g., with a mouse, touch screen inputs, etc. Further, an embodiment facilitates region selection via a semi-automated process of boundary fitting for selecting objects. By way of example, an embodiment assists a user in accurately selecting or highlighting a region of interest, e.g., a person, building, road, etc., by taking an initial input by the user, e.g., indication of one or more origin pixels, and expanding this selection in a stepwise fashion using image analysis. For example, if a user initially indicates origin pixels within an individual object, a boundary fitting process expands the origin pixels outwardly in the image using an image quality metric, e.g., pixel value such as greyscale, color, etc., to find a logical boundary for that object, e.g., a point at which the pixel value(s) of interest change by a threshold amount. If the object boundary identified is accurate, the user can accept the auto-fitted boundary, otherwise further input, e.g., continued or repeated manual selection within the currently indicated boundary, causes an embodiment to repeat the process, i.e., find the next logical boundary using an image analysis technique to progress outward in a stepwise manner. In this way, a user is assisted in controlling a semi-automated object detection feature. As will be appreciated, by use of related data, e.g., associated metadata descriptions for the object or like objects, the semi-automated process of finding the boundary of an object in an image can be improved for future boundary fitting, and the boundary fitting process may be fully automated in some cases.

Figure 5:
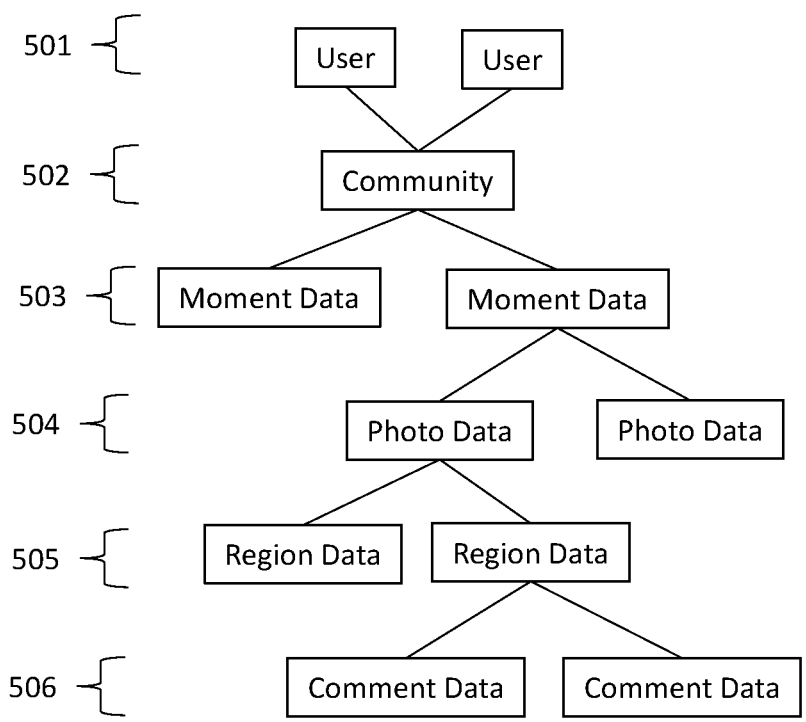
FIG. 5 illustrates an example logical organization of image related data entities.

The embodiments described herein provide rich datasets associated with image regions, and these datasets may be leveraged for a variety of applications that rely on the datasets and their relationships with other image-related entities. Turning to FIG. 5, an embodiment utilizes a logical relationship between users, communities, moments, photo or image data, region data, and comment or description data to index image and related metadata to facilitate search, training and collaborative sessions, and other applications. As illustrated, user entities 501 may be associated with communities, which are groups of users, for example assigned to a role or included in a group, e.g., work group, social network group, etc. The communities or role entities 502 are in turn associated with moment data 503, i.e., datasets including one or more photos or images, regions, and associated descriptive metadata. The moment data 503 is in turn associated with photo or image data 504, which is in turn associated with region data 505 and comment or descriptive data 506. This logical structure facilitates a multiplicity of possible functions related to the images, as described herein.

In FIG. 6 is illustrated an example of relational storage in which user IDs are stored in direct association with photo IDs, region IDs, description IDs and descriptions. In the example of FIG. 6, a first user ID, User A, is stored in a column that is logically associated with a photo ID column entry, photo ID 1234. A second user, User B, is stored in a subsequent row and is also logically associated with photo ID 1234. However, User A is associated with description ID 001, whereas User B is associated with description ID 002. Consequently, User A can access description Text A, whereas User B can access description Audio A. This permits differential handling of which dataset (e.g., image, region, and description) is returned to a specific user.

By way of example, an embodiment may be used in an online collaborative session, for example as part of a social network or in connection with a real-time collaborative session, such as an online image sharing session. Referring to FIG. 1, if a user ID, e.g., User A, is received at 107, an embodiment may determine at 108 that User A is associated with photo ID 1234, and therefore a specific image, which can be provided at 109 to User A, e.g., in a browser or mobile application. Likewise, if a user ID, e.g., User B, is received at 107, an embodiment may determine at 108 that User B is associated with photo ID 1234 as well, thus providing User B with a specific image, similar to User A. This may be done during the same session, e.g., such that User A and User B may view the specific image at the same time, interact with one another, e.g., via text, voice or video communication, and interact with the image, e.g., further annotate and describe regions of the image. As described herein, each user may have a specific dataset provided, which may or may not overlap with a dataset provided to another user, as part of the same real-time collaborative session or provided at different times. In the example of FIG. 6, User A and User B may be provided the same images; however, each user may be provided with different descriptions for the same regions of the photos. This may be done for a variety of reasons, e.g., perhaps User B prefers audio-based descriptions, User A may be allowed to only access certain data describing a part of a machine, a user of a social group may only be able to see certain textual descriptions for an image's regions, etc. As will be appreciated by those having ordinary skill in the art, column and row level security can be applied, e.g., to restrict user IDs (or other identifiers) to certain data access.

Further, an embodiment permits dynamic expansion of a database, e.g., for example as illustrated in FIG. 6, to index additional information with respect to the images. As illustrated in FIG. 6, any number of additional regions and descriptions can be added, as indicated by inclusion of additional column N and related rows. In an embodiment, additional columns may be included to accommodate additional region selections and related descriptions for an image. Further, links to other data tables may be included, e.g., to link a user ID with a group ID (not explicitly illustrated) and table data associated with (accessible to) the group ID. Further, entries in the database, such as a region ID, may be logically associated with other data, such as pixel coordinates for a specific image, which may be stored in another column or table.

The indexing structure of an embodiment may also be applied to various scene-based contexts including augmented reality (AR) or virtual reality (VR). In the non-limiting example of augmented reality, and referring to FIG. 7, an embodiment may analyze captured image data, captured at 701 from a camera, e.g., associated with a head mounted display, AR or VR googles or headset, or a smart phone. The image or images captured may be received at 702 and subjected to analysis to identify the contents thereof. For example, images streamed from a headset to a local or remote processor may be analyzed using image processing techniques, such as object detection and identification, that facilitates recognition of specific regions or objects within the image. Other data may supplement or facilitate this process, e.g., location-based data indicating a room that is being viewed, compass or accelerometer data indicating the direction of viewing, etc.

Thereafter, if an image identification (or region identification or object identification) is associated with a dataset, as determined at 703, the dataset can be provided back to the user's headset or other AR display device for combination with the live image, as indicated at 704. The dataset, for example, includes region specific metadata that augments the image in the display. By way of specific example, and referring to FIG. 2, a user viewing a machine of the type depicted in FIG. 2 may have the image analyzed, e.g., by a cloud-based image processing application, to identify the specific machine type and angle of view. This image identification may be used in combination with other data, e.g., a user ID, to select an appropriate dataset, e.g., a set of regions and associated descriptions, such as the gasket location in that specific view of that specific machine type. This descriptive, region-specific metadata is provided back to the user device for AR display, e.g., at 704. This permits the user to image the machine using a local device and retrieve previously prepared descriptive metadata, e.g., the location of the gasket on that specific machine type, useful for example in finding the location of the gasket for inspection and repair, etc. As described herein, the identification of the image or image content may be accomplished using machine learning or artificial intelligence, e.g., to identify previously trained objects that are contained within the image. In this regard, region IDs, e.g., as described in connection with FIG. 5, may take the form of object IDs. Updated user annotations may be supplied to use as further positive or negative training examples such that an artificial intelligence program gradually learns to identify the objects being viewed. In an embodiment, the image metadata, e.g., for use in AR scene augmentation, may be predetermined and supplied using any suitable identifier, e.g., image identifier, geographic identifier, etc.

As illustrated in FIG. 8, an embodiment provides a user interface 801 for addition of region-specific descriptions for images 800 to associate images 800 with content identifier groupings. An embodiment may provide a user interface 801 for adding various content identifier groupings for different types of photos. For example, an embodiment may include content identifier groupings such as D (dates), N (names), L (locations), R (routes), S (structures), P (pets), E (environment/event), I (individuals), and T (other things) for a group photograph 800 such as that illustrated in FIG. 8. Other content identifier groupings are of course possible. As a non-limiting example, the image 800 illustrated in FIG. 8 includes an outdoor group photograph in which content identifier groupings E1 (environment/event), L1 (location), I1-I4 (individuals), S1-S2 (structures), R1 (route), and T1 (thing) are provided in the user interface 801.

Each content identifier grouping includes a subset of possible data entry types, as illustrated. In an embodiment, a user manually enters text for each known data entry type. In the example of FIG. 8, the I (individuals) content identifier grouping includes possible data entries of NAME, NICKNAME, AGE IN PHOTO, DOB, GENDER, RELATION TO N1, TRADE/PROFESSION, EMPLOYER, and SCHOOL. A user may manually enter data for any of these fields via interface 801 and an embodiment will store this data as image metadata associated with the respective image region. That is, in an embodiment the image metadata is associated with a specific region of the image 800, e.g., indicated in the example of FIG. 8 by content identifier groupings (T1, R1, S2, E1, I1, I2, I3, I4, S1, and L1) appearing in the image 800 proximate to the regions of the image 800 associated with that metadata. As such, a user interacting with the image 800, e.g., touching on the I1 identifier indicia or the individual (group of pixels) associated therewith, allows an embodiment to determine the associated metadata, e.g., individual 1's occupation, and search for images or other data that are associated therewith, e.g., via similarly associated image metadata.

An embodiment may automatically suggest the content identifier groupings for display in user interface 801 based on image processing, e.g., using object detection and identification, the content identifier groupings may be manually chosen by a user, or a combination of the foregoing may be used. In an embodiment, manually chosen content identifier groupings, associated with objects or regions in the images, are used to create a training set for an artificial intelligence program, e.g., an artificial neural network. This assists the training of such an artificial intelligence program by providing a set of positive training images and content category identifiers and/or data entries associated therewith. As such, an embodiment will improve over time with respect to identifying if an object type is included in the image and which content category identifier(s) are associated with that object type. Therefore, as more community members add annotated images and these are used as positive training examples, the image processing will improve. This will assist an embodiment in automatically identifying associations between image regions or objects and content category identifiers and/or the associated data entries. For example, an embodiment can learn that a face is associated with category I type identifiers, whereas a road or bridge is associated with content R type identifiers. Further refinements are possible, e.g., training an embodiment to recognize a specific object type using the descriptive metadata associated therewith, e.g., a particular machine model.

These learned associations can be used to automate or improve certain functionalities, e.g., improving image searching by promoting certain results based on learned similarity, etc. An embodiment may utilize artificial intelligence to associate images using their content category identifiers and associated data entries. As an example, an image's content category identifiers and the associated data entries make up a photo genome, which can change over time (i.e., as content categories and/or data entries are added, removed, or modified), and this allows photos to be related to one another. For example, images having similar content categories can be inferred to have similar content. Likewise, more refined similarity scoring can be accomplished using content category identifier data entries. By way of example, two images each having the same content category identifier, e.g., R, share that level of similarity, whereas two images that have the same content category identifier, e.g., R, and data entry, e.g., Route 79, share a more refined level of similarity. As may be appreciated, the more content category identifiers and content category identifier data entries two images share, the more related the two images are. This property of the images can be leveraged for a variety of functionalities, e.g., image search, content recommendation, etc. As will be understood by those having ordinary skill in the art, the photo genomes of images can be associated, classified, clustered or otherwise related using a variety of techniques.

Figure 9:
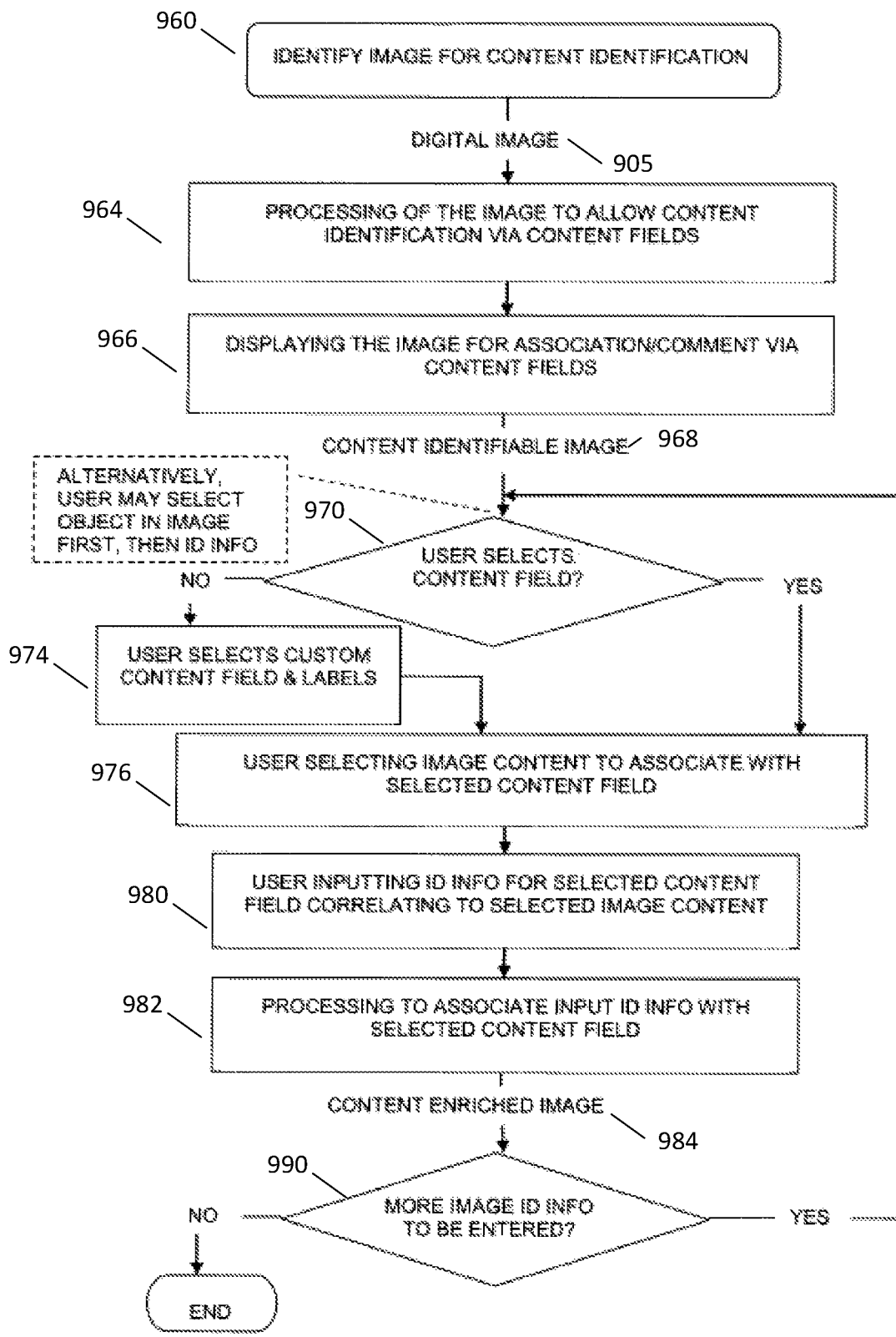
FIG. 9 illustrates an example of a process or application for tagging/commenting on an image.
Figure 10:
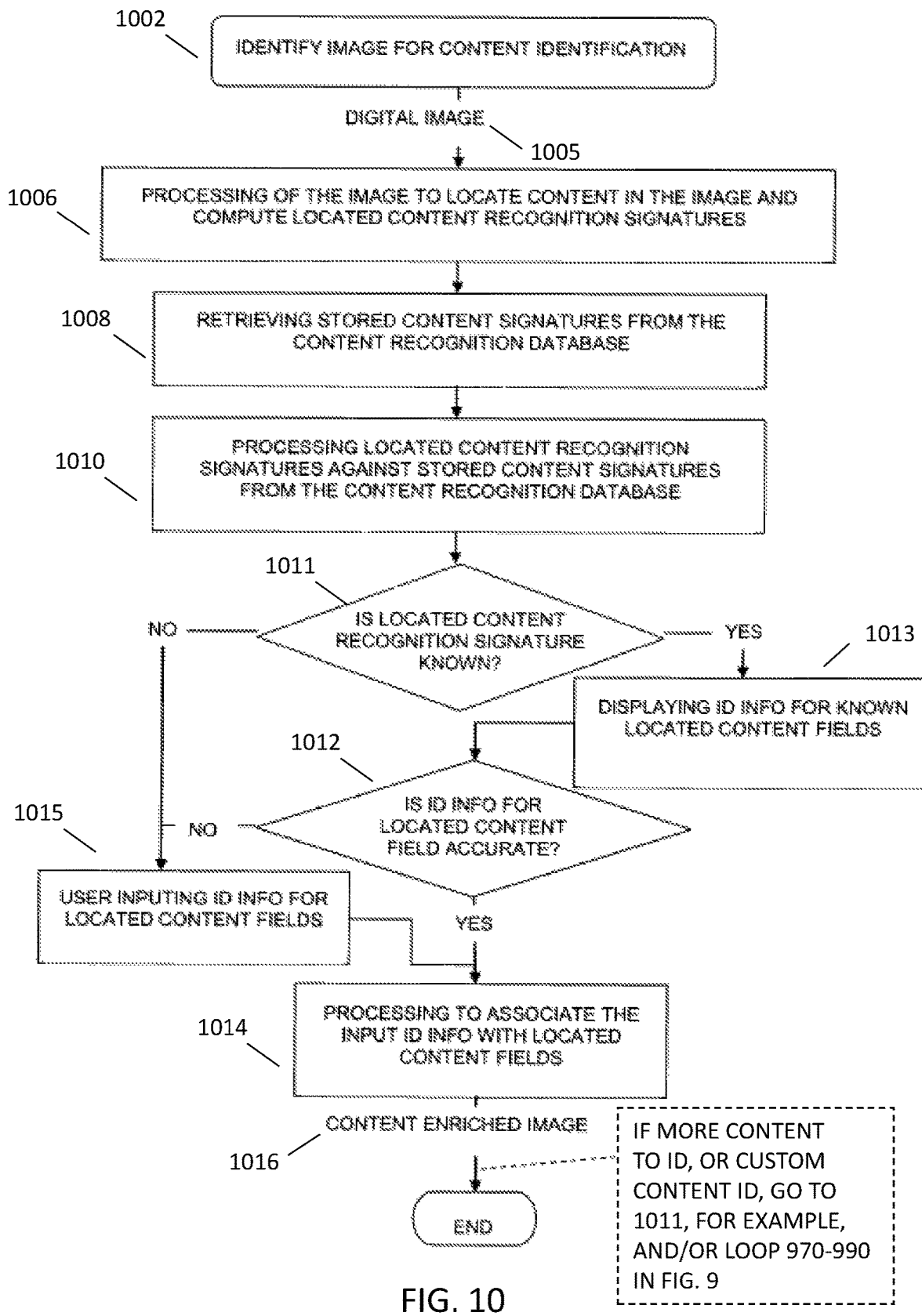
FIG. 10 illustrates an example of a process or application for tagging/commenting an image.

FIGS. 9 and 10 illustrate embodiments of an application or process for content identification that has configured or programmed one or more data processing components and the associated data storage components of a capture device (e.g., an application's processor and integrated circuit memory; a digital signal processor; a microcontroller; etc.) and/or computer 1810 and/or cloud computing/storage infrastructure to perform the recited operations and variations thereof. The following references to tagging, associating and/or commenting applications are interchangeable with tagging, associating and/or commenting processes, which are the processes/applications performed via a content capture device and/or computer 1810 and/or cloud computing/ storage infrastructure when running the content identification applications.

The content identification application may have multiple steps including identification, selection, recognition, and/or association steps as shown in FIGS. 9-10. Referring collectively to FIG. 9-10, in the one or more identification steps 960, 1002, the content identification application may accept and process 964 an identified digital image 905 from a user employing a content capture device and/or computer 1810 for content identification and may assign the image 905 a unique identifier in a content management system for storing in the content database. The unique identifier associated with a particular digital image 905 may have some content identified by other applications running on third party servers and/or the computer 1810, which may be stored via third party data and/or storage and/or on the capture device storage itself, and/or no content identified when it enters the content identification applications. Further, the unique identifiers may include, for example, a serial number, an alphanumeric identifier, a bar code, or an image based 2D barcode defined by a predefined subset or the entirety of light/dark pixels represented in the digital image 905.

In the image content identification steps 966-990 of FIG. 9 and 1012-1016 of FIG. 10, the content identification application may associate ID information for selected image content 982, 1014 via the user for the particular content of interest displayed in the image 905, 1005. As illustrated in FIG. 10, at step 1006 the content identification application may further be configured to locate content in the uploaded digital image 1005 and compute recognition signatures for located content as may be performed by various applications used to detect and analyze objects/content in digital images generally. Located content may include a variety of content associated with specific portions of the image 1005 including faces, places, structures, streets, plants, animals, events, things, etc., as described in further detail below and also illustrated in FIG. 8. Such content may further be classified and/or categorized as shown in FIG. 8 and given content identifier groupings such as dates (D), names (N), locations (L), routes (R), structures (S), pets (P), environment/event (E), and other things (T) in the image 1005.

As illustrated in FIG. 9, via steps 970-990, a content identification application may display 966 the content identifiable image 968 (as shown, for example, in FIG. 8) such that the user employing the content identification application may select content fields 970 so as to associate image content with the selected content field at step 976. In the event the user does not find a content field for information in the image the user would like to identify, the user may select and label a custom content field 974. Alternatively, as will be understood by persons of skill in the art, a user may begin by selecting image objects first, for example as shown on a touch screen display in FIG. 8 via user finger input selection and/or mouse selection, and then ID information in a selected content field for that selected image object (e.g., person, residence, etc.). In the image information identification steps 976-982, the application associates the ID information for the content in the image 905, user input via step 980, and may prepare a content enriched image 984 via step 982 for transmission to a computer readable storage medium such as, for example 1830 or 1870. Additional image ID information may be entered via step 990.

In other embodiments, as shown in steps 1008-1011 of FIG. 10, the content identification application may process the located content recognition signatures against stored/known content signatures in a content database and/or infrastructure and/or data in the digital image 1005 by preliminarily matching the located content recognition signatures with related stored content signatures. At step 1012, the user employing the content identification application may verify or deny the accuracy of the preliminary matching of ID information for known content fields, if available. In the image information identification steps 1012-1014, the application associates the ID information for the content in the photo 1005, either by user verification via step 1012 or user input via step 1015, and may prepare a content enriched image 1016 for transmission to a computer readable storage medium such as, for example 1830 or 1870. Additional ID information for content may be entered if desired, similar to step 990 in FIG. 9.

In another embodiment, as illustrated by a practical application shown in FIG. 2, one or more steps 960-990 may be executed for content identification. The content identification application may be employed in an industrial setting by one or more factory workers (not shown) to display 966 the content identifiable image 968 (as shown as picture 210 captured by a factory worker of a machine, for example, in FIG. 2). Such display 966 of images 968, 210 may be displayed for example via device screen such as on a tablet or smartphone computing device. The factory worker employing the content identification application may select content fields 970 (as shown as, for example, title area 240 and/or descriptive area 250) so as to associate image content with the selected content field at step 976. In one embodiment shown in FIG. 2, the factory worker selects custom content field 974, shown as title area 240, and may enter text "Leaking gasket". Alternatively, as will be understood by persons of skill in the art, a factory worker may begin by selecting image objects first, for example a form fitting boundary outline 220 of a gasket shown in FIG. 2 via user finger input selection and/or mouse selection, and then ID information 980 in a selected content field (e.g. title area 240) for the gasket. In addition, or alternatively, the factory worker may further embed ID information 980 for the image 210 using information identification steps 976, 982 using the descriptive area 250 for the gasket via text 260 or audio input 270 associating such free form description 260, 270 with visual identifying indicia such as colors, numerals, etc. to associate same with the specific respective regions 220, 230. Such identifying indicia, in one embodiment, employs custom content field and labels 974 to further correlate image objects with ID information regarding same in order to visually connect the image object selected (e.g., gasket selection 220) with the specific ID information 280 associated with each image object chosen. The application associates 982 the ID information 980 (e.g., metadata 260) for the content in the image 968, 210, user input via step 980, and may prepare a content enriched image 984 via step 982 for transmission and/or storage to the device and/or other computer readable storage medium such as, for example, 1830 or 1870.

In one embodiment, one or more steps of a content identification application may automatically commence operations in response to a user command to digitally capture a photo using a scanner (also referred to as camera/CCD) at operation 960, 1002. As used herein, identifying or capturing a photo, and variations thereof, are understood as emanating from the process of conversion of light waves off of an object, such as a physical photo or other object, that are sensed by an electronic imager, such as a charge-coupled device (CCD) or a complementary metal oxide semiconductor (CMOS) chip, into a digital image comprised of pixels. The digital image 905, 1005 may be stored in either transitory or persistent memory in a digital image file format (e.g., Joint Photographic Experts Group (JPEG), Exchangeable image file format (Exif), Tagged Image File Format (TIFF), Portable Network Graphics (PNG), RAW image file format, Graphics Interchange Format (GIF), BMP file format, etc.).

In another embodiment, the identification steps may commence operation after being manually invoked by a user such that a content identification application operates on a previously captured image 905, 1005 stored in a capture device or other storage location for such images.

Figure 11:
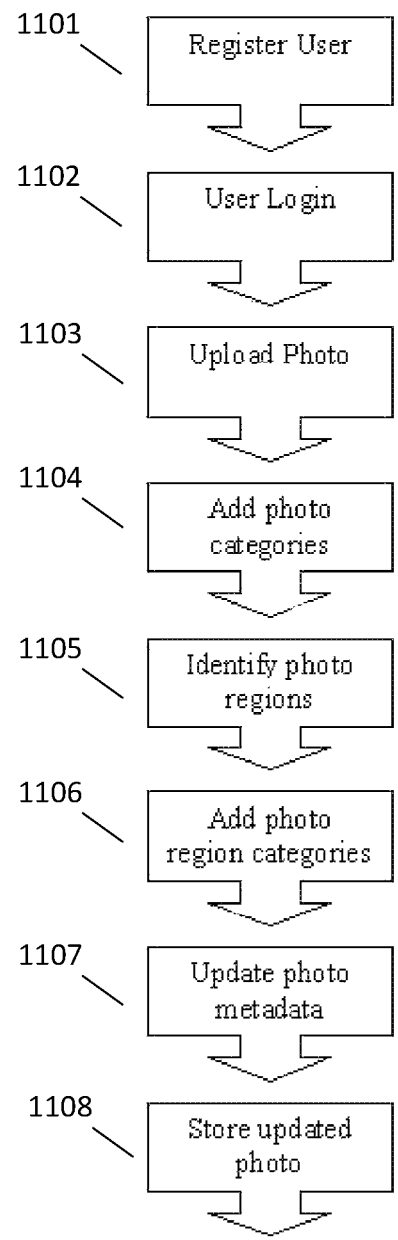
FIG. 11 illustrates the basic flow of operation with a photo management system.
Figure 18:
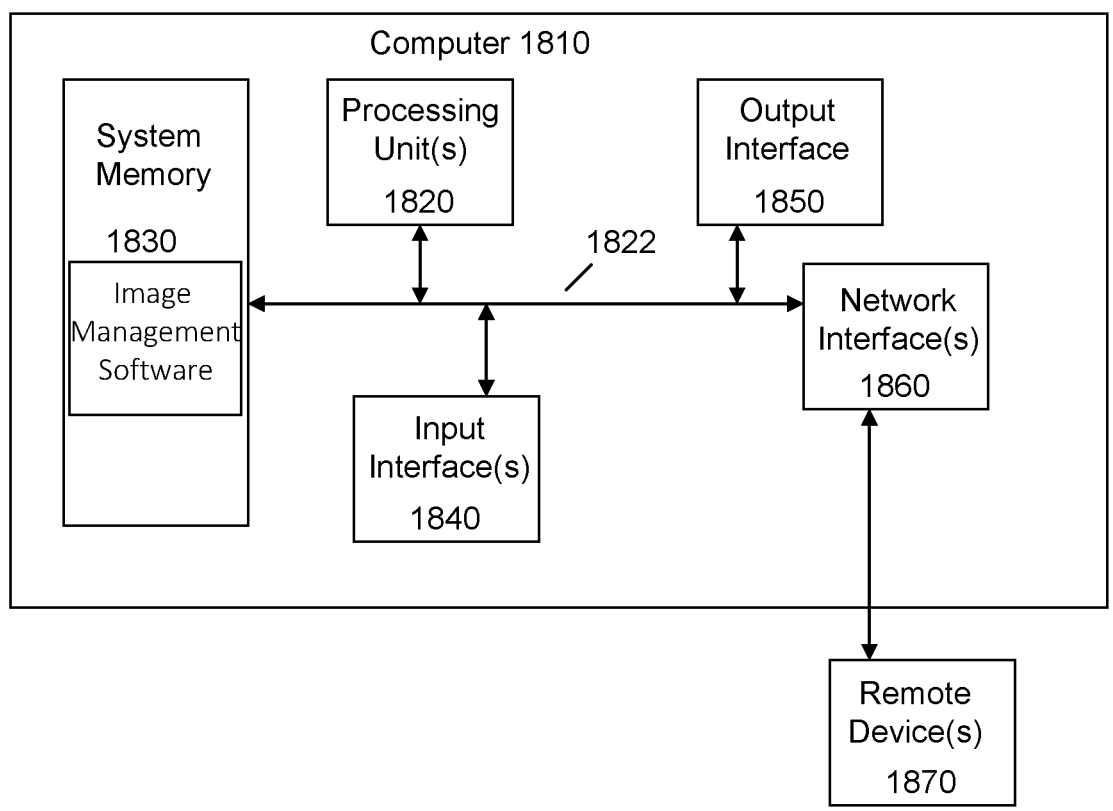
FIG. 18 illustrates an example computing device.

FIG. 11 is an illustration of the basic flow of operation using an example embodiment, which may be performed using computing system as shown in FIG. 18 for example. First, a user would be registered to have access to the system as illustrated at 1101. Second, a user may log into the system at 1102. Then, a user may upload a photo to the system at 1103. In the same process, a user may attach one or more categories to the photo to identify the photo for its value at 1104. Thereafter, a user may highlight regions of the photo that may be of interest to him or other users at 1105, and select the region with a set of region coordinates. After selecting a region, the user may attach a category to the region to identify the value of the region at 1106. The metadata associated with the photo will be updated at 1107, and the photo will be finally stored in the database at 1108.

Figure 12:
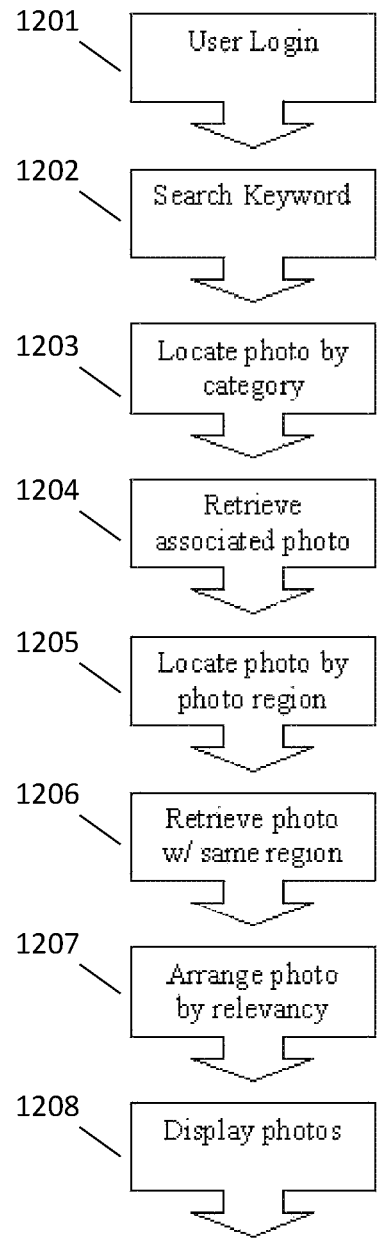
FIG. 12 illustrates the basic flow of a search operation with a photo management system.

FIG. 12 illustrates the basic flow of operation of an example embodiment to search for related photos, which may be performed using computing system as shown in FIG. 18 for example. At 1201, a user would log in to the system, and enter one or a set of keywords at 1202. All the photos containing categories relating to the keyboards will be found in the database and retrieved, as illustrated at 1203, 1204. The system would then search for region categories at 1205, so those photos with region categories that are similar to the keywords would be found and retrieved at 1206. All the photos found thus will be arranged based on their relevancy, as illustrated at 1207, and displayed accordingly at 1208.

Figure 13:
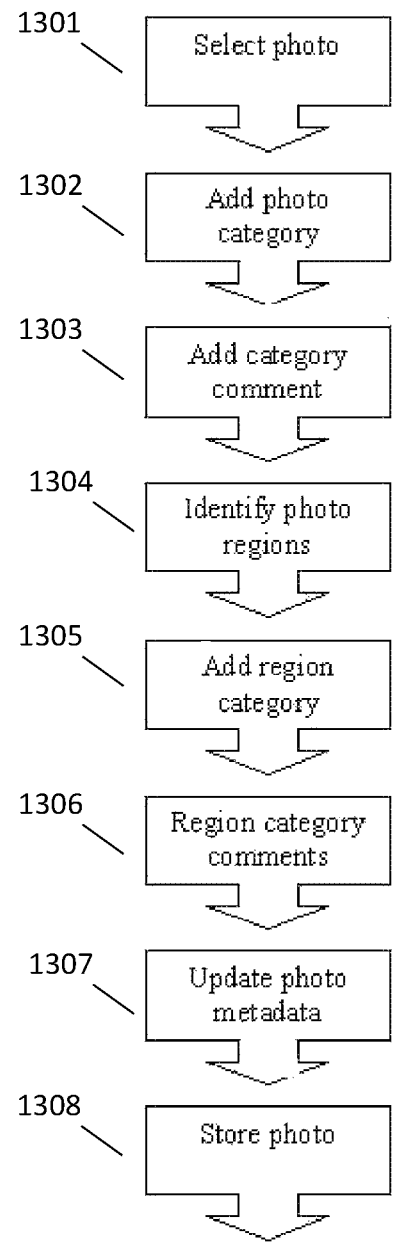
FIG. 13 illustrates the basic flow of an embed information operation with a photo management system.

FIG. 13 illustrates the basic flow of operation using the system to add information to the photo's metadata so the photo could have increased value to all users, which may be performed using computing system as shown in FIG. 18 for example. A user with access to the system would first select the photo of interest, as indicated at 1301. The user would then identify the photo with a category at 1302. Such a category would apply to the entire photo, conveying an identity that applies to the photo as a whole. Then a user may choose to further describe the photo category with comments to elaborate on the meaning of the category, as indicated at 1303. Next, the user may identify specific regions of the photo that may be of interest to him or her at 1304. Such specific regions can be of buildings, person, objects, or activity. A region category will be added to each region, as indicated at 1305, and further comments can be added to such region categories, as indicated at 1306. Finally, the metadata of the photo will be updated with the new categories and region categories, as indicated at 1307, and the photo will be stored in a database, as indicated at 1308. Such a photo would be now more searchable for many users looking for different values in a photo.

In an embodiment, a database contains photos, each of which is described by metadata. More importantly, each photo can be divided into smaller sections by region coordinates. These smaller sections are used to identify specific objects contained within a large photo, so that each photo can be accurately labeled to reflect all the objects present in a photo. A region comment may be associated with each photo region, so that a detailed description about the particular region can be entered. Subsequently, the region comment will be searchable by any user. The photo regions can further be categorized in region categories, so that each object in a photo region can be better organized and managed in the database.

A user's profile may be managed in the database, which also provides access to the photos. Any user of the object-based image management system would be permitted to browse through all the photos and edit photo regions and photo region comments. This creates a community of users who can provide different insights into the value of a specific photo. Such a community can provide valuable service to everyone involved, because an increased number of objects can be identified and analyzed in each photo. Because every user differs in considering what may be valuable in a photo, a photo can be made much more valuable to multiple people.

An example of the benefit of a community-based photo management can be described by the following example. An alumnus found a photo of a rally in his college days, and decided to share the photo with the rest of the alumni community. While using the region editing function to identify everyone he knows in the photo, he recognized a person who served as a residential advisor on the 4th floor of his dorm. However, he did not know the name of this person. Thus, he simply associated this particular photo region with the region comment of "4th floor RA." Another alumnus coming upon this photo knows the person who served as a 4th floor RA, and saw that the region comments did not reflect his real identify. Such an alumnus would then be able to edit the region comment to correctly identify this person. Thus, through collaborative mechanisms, the photo may be now correctly labeled to identify all the persons of interest. Such a feat may be currently unavailable through existing image sharing systems.

Another example would be identifying additional objects in the same photo. Let us assume that neither of the alumni knows or cares about a hot air balloon in a rally photo, but this particular hot air balloon holds some value to another member. One of the users may feel the need to label this hot air balloon along with information such as year, location, or manufacturer (if necessary), so that this particular photo region can now be searchable.

Assume that one of the users has been looking for this particular hot air balloon due to some important memories, and has searched all over the web without success. After a user of an embodiment identified the photo region, this image, originally intended to only commemorate an old college rally, is now turning up in searches for a particular air balloon. Thus, the user interested in the hot air balloon can now find this photo and use all the other associated photo region comments to help locate the owner of the hot air balloon. Such a feat is not possible with the current image sharing system online, because all the images are limited by the subject description by a single user. Granting photo region tagging ability to a community of users eliminates the bias that would normally be associated with an image storage system.

Figure 14:
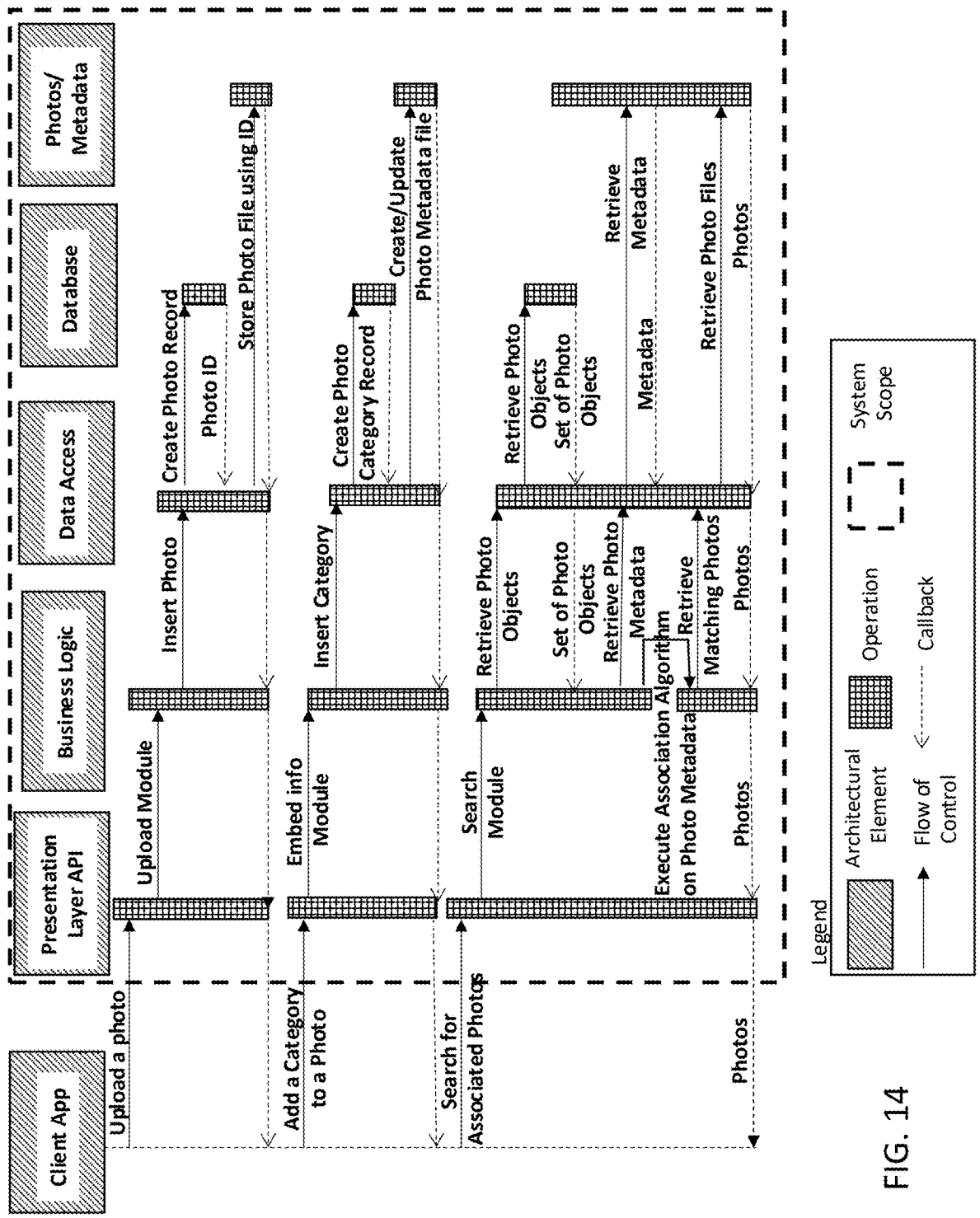
FIG. 14 provides a detailed depiction of the operation in the photo management system.

As can be seen in FIG. 14, and as described herein, the system may be divided into the following sections: client application, presentation layer API, business logic, data access, database, and, on the last level, photos and their associated metadata. When a user decides to upload a photo, the user may select the image from the device on which the client application resides and submit it to the system. Such an image may be previously stored on the user's device, which may include computers, mobile phone, or other mobile devices. In some embodiments, the image may be captured in real time via an image capture means associated with the user's device.

Once a user has selected the image he or she wishes to submit to the system, the presentation layer API will provide an intuitive interface to guide the user through the rest of the upload procedure. Subsequently, the business logic will insert the image into the data access. The data access provides a pathway to the database, which may be where the image will be stored and organized. The system will prompt the user to provide a name for the uploaded image, which will be converted into a photo ID attached to the image. Finally, the photo may be associated with an ID and stored, along with any metadata associated with the photo, into the data base. This photo ID, although useful to the uploader and can be used to summon the image, may be not the sole identifier of the image. This is in accordance with the goal of an embodiment to create variable identifier for each given image, so that the image can be identified and retrieved by those who do not associate the photo with its photo ID.

Once an image has been uploaded, a user may assign a category to the photo using the client application (client app). In an embodiment, any user with access to the database would be allowed to assign a category to the uploaded photos, so that all possible value of the photo can be identified by a community of users. It may be important to have photos associated with categories, more than just its file name, as the textual and data value of the file name is limited and cannot fully reflect the full range of values available to each photo. As such, a separate identifier called a "category" will be used to further identify the image.

The presentation layer API provides the comprehensive user interface to add a category as embedded information to the photo. The business logic will insert the category received from the embedded information module to the photo. A photo category record will be created for the photo in the database, and such a category will be added to the photo's metadata. Such data will be searchable to all those with access to system. In instances where a photo may be uploaded with no preexisting metadata, the system will create a new metadata file associated with the photo.

In an embodiment, every region of the photo can also be identified and categorized. A photo may contain various objects, such as a vase, or a playing cards, that can be identified and labeled. In one example, a hot air balloon can be identified by a region and a category can be associated with the hot air balloon. Thus, the photograph will not only be associated with certain people or events, but also a physical object. Because every object in a photo may be enclosed within a set of pixel coordinates, every object can be identified by the appropriate coordinates. As such, a photo can be further categorized by such regions, based on the photo objects identified by the pixel coordinates. Such region-based categories will also be associated with the photo within its metadata, providing the photo with increased value.

Once a photo is properly uploaded and embedded with category information, the photo will become an item that can be retrieved based on its metadata. In other words, this image will be retrieved when any of its categories appears in a user's search. Thus, this image will no longer by retrievable by only its file name, and can be accessible to a user based on its otherwise hidden utility. To search for associated images within a category, a user may employ the search module from the presentation layer API. The user may identify a keyword or phrase, and the business logic will return a set of photo objects or categories to the user, which will exist as part of a photo's metadata. A user may then select the categories most relevant to the keyword or phrase, and the business logic will retrieve the metadata containing the selected photo objects or categories. Once a set of metadata is returned to the business logic, an association algorithm will be run on the set of metadata to identify all matching photos. Finally, these matching photos will be retried from the database and returned to the user's client application.

As the above process indicates, all the photos submitted to the present system will be given multiple identifiers so that all the possible value of the photo can be identified and utilized. Each architectural element will be responsible for an immediate operation for the proper storage and analysis of the photo. In an embodiment, a community of users has access to every photo, so that an abundance of photo objects can be identified and the applicable categories can be embedded. As such, every photo will have a considerable search-ability and value provided by the associated metadata.

Figure 15:
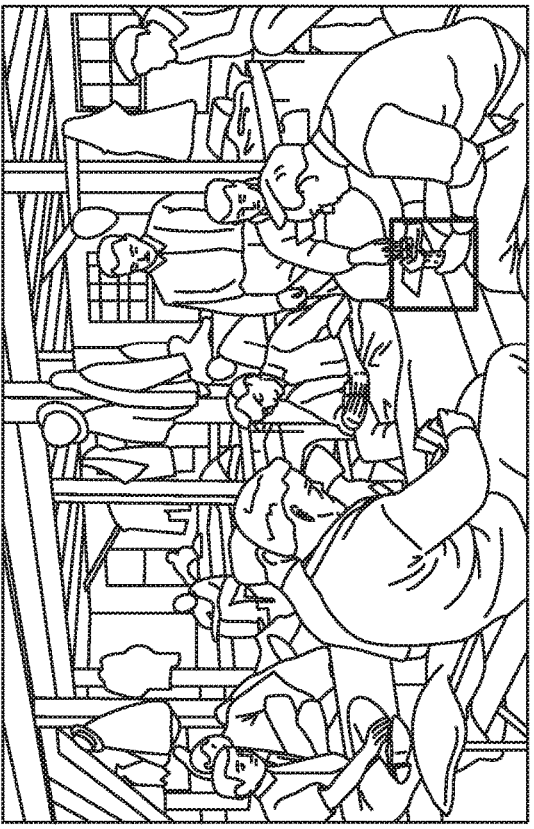
FIG. 15 illustrates an example of a picture displayed in a user interface.
Figure 16:
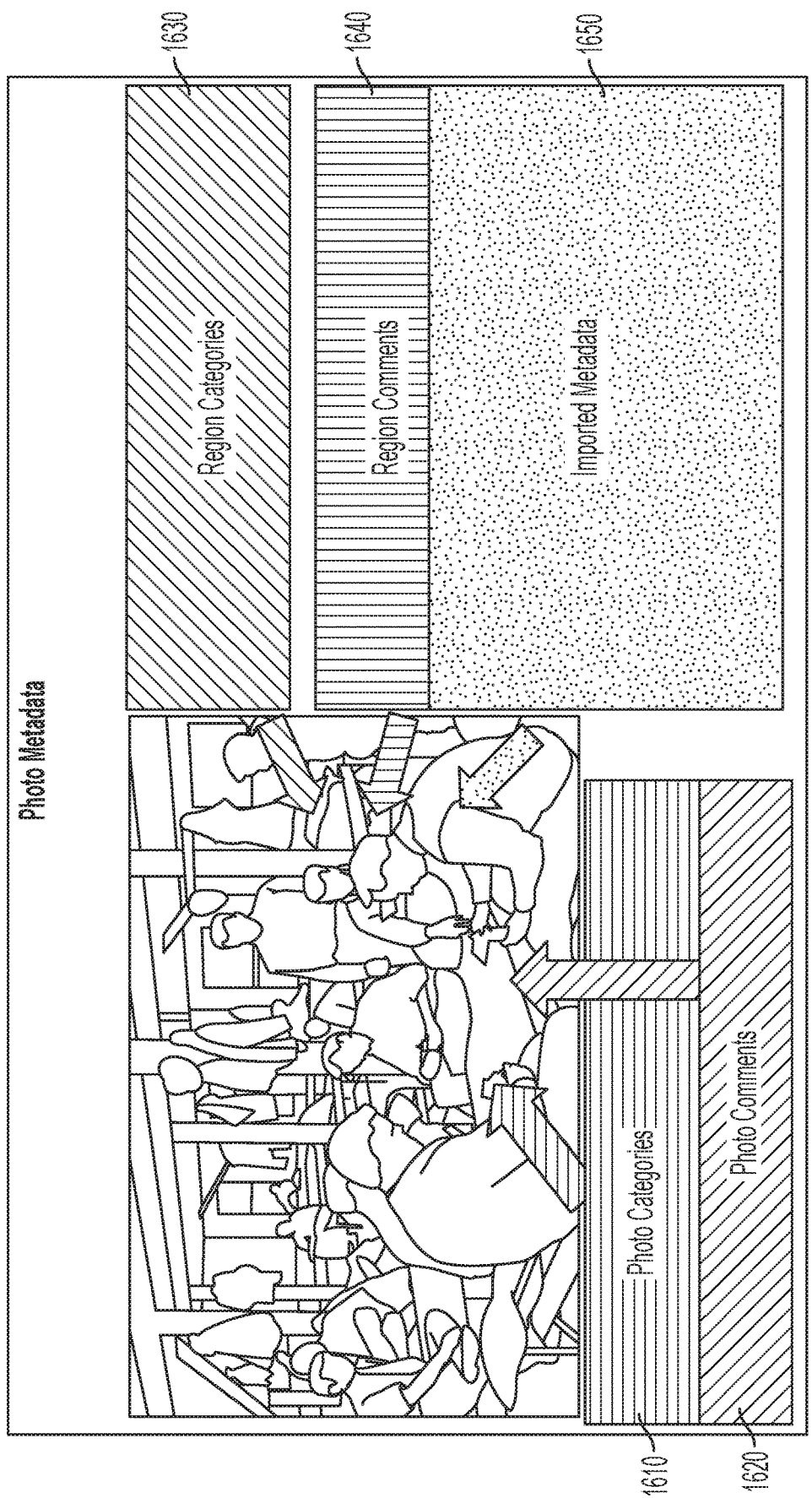
FIG. 16 illustrates areas of an example interface for a picture display.

An example of a photo's metadata structure is illustrated in FIG. 15 and FIG. 16. A photo may be uploaded to the present system. The user knows the one person in this photo, who is named Mike Todd. As such, this photo may be initially labeled to identify "Mike Todd". In a traditional image management system, this photo will only be searchable for terms related to Mike Todd. This is incredibly misleading because there are many people present in this photo, and other users may know these people. Or they would like to see the person they know in such a photo. However, in an existing photo management system, they would not find this photo unless they know a "Mike Todd" is present in the photo.

Using an embodiment, on the other hand, other categories can be added to further identify this photo. In the example given, a region highlighting the poker game may be identified, and categories are named for such a region. One user identified this region under "Event: Poker Night", and another user identified this region under "Game: 3 card poker". As such, this photo is now retrievable under search terms related to "poker night" or "3 card poker". The utility of such a system may be illustrated as thus: a user may know one of the persons in the photo, but he does not know who Mike Todd is. All he knew is that his friend played poker while he was in school, or that he enjoyed 3 card poker in particular. He may now, as a user of the present system, search within the present database for "poker night" or "3 card poker". Lucky for this user, this photo will turn up. Under the traditional system, this user would not be able to find the photo because the photo was initially associated with an attribute that may be unknown to him.

In an embodiment, the system may be also capable of searching for imported metadata within the photograph. On occasions, a photo has embedded information that may be unseen or unknown to any user. However, such embedded metadata may be visible to those who know where to look. The present system will be able to comb the uploaded photos for any existing metadata and import them into the database. Such metadata, because it is not specifically organized by the users of the present system, will be displayed under a separate "imported metadata" field. Thus, any user looking at this photo will be able to use the imported metadata to accurately further categorize the photo and its associated regions.

FIG. 16 illustrates the layout of the image display in an embodiment. Immediately under the photo are the primary photo categories 1610 and their associated comments 1620. The user uploading the photo would be able to label the photo according to his sense of value applicable to the photo, and the user would be able to elaborate or describe the photo in greater details using category comments. Once the image is stored, other users can also attribute categories 1630 and category comments 1640 to the photo as a whole. Next, the photo can be divided into regions and identified with greater specificity. Once again, those submitting the region categories will be given the ability to provide region category comments to elaborate on certain regions. All users, including the one originally uploading the photo and those who have found the photo through associated searching, would be able to contribute to the categorization of photos and their regions. At last, imported metadata 1650 associated with each photo would be displayed alongside other information to provide an organic field of information. Such a field of information can provide insights to other users as to how the photo can be further identified. In an embodiment, all the textual information in the above fields may be searchable through the system in order to find associated images.

Figure 17:
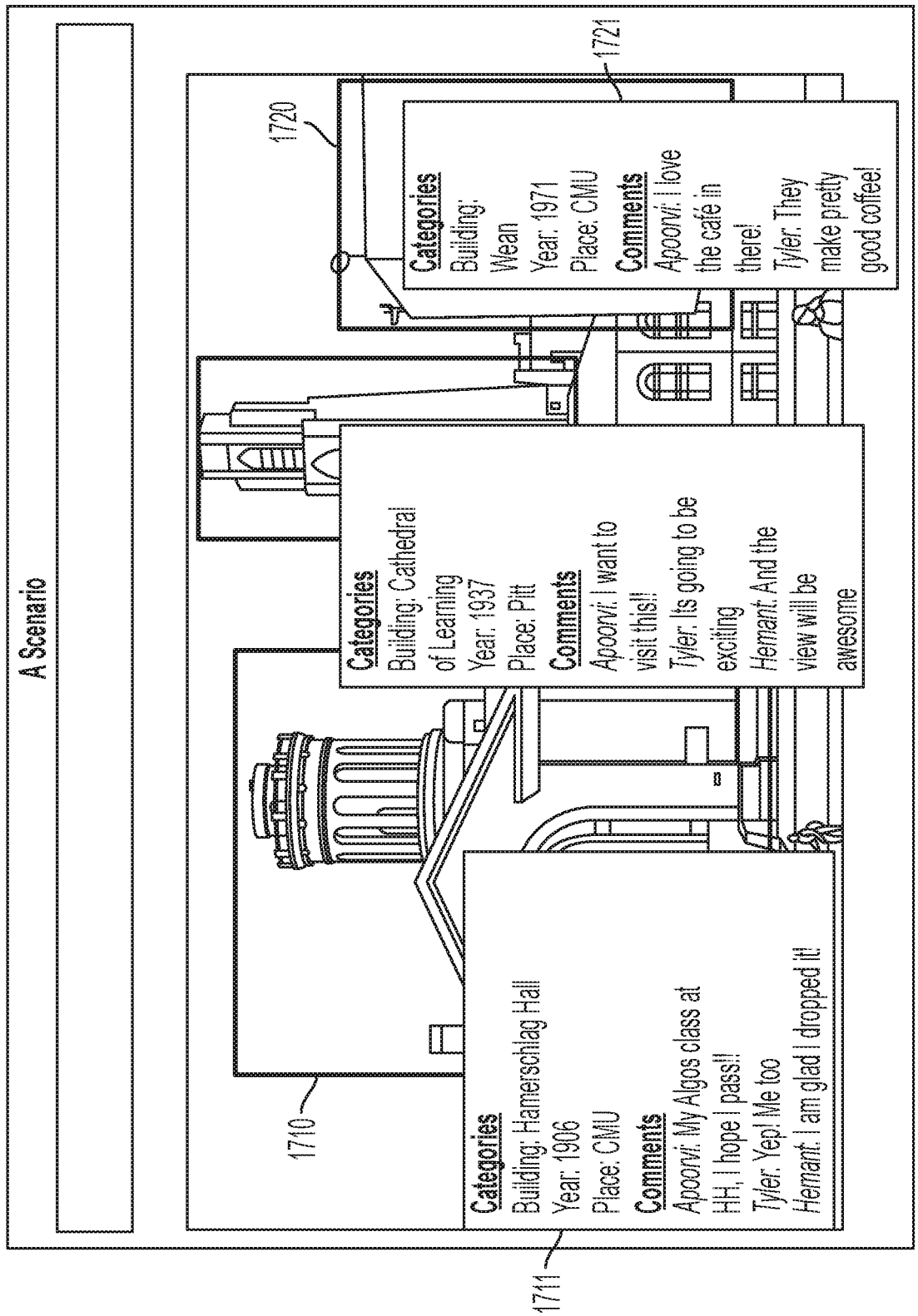
FIG. 17 illustrates another example of a picture displayed in a user interface.

Another example of a scenario may be provided in FIG. 17. This is a photo of an area on the campus of Carnegie Mellon University. We see various buildings in this photo, and each may be described by various users in detail. For example, a region outlining the Hamerschlag Hall may be identified 1710, and a category reflecting this region may be added 1711. Further, more information regarding the building is also attached to this region, including the year of construction and the location. A community of users can provide further comments and discussion regarding this building. Such comments provide additional insight into the building that cannot normally be discretely associated with a building. In another example, a user commented on the region outlining Wean Hall 1720 remarked on the quality of the coffee 1721. Another user may simply be searching for a place that sells coffee, and would be directed to this image thanks to this comment. This user is now privy to the fact that Wean Hall sells good coffee. This type of application may be a natural utilization of the present system, as would be understood by a person with ordinary skill in the art.

In one embodiment, the outline of the region in a photograph can utilize an object boundary algorithm to further conform to the objects of interest in the region, as described herein. For example, the hat hanging on a post in FIG. 15 can be highlighted according to its shape. Such pixel information can further be stored in the present database as an extension, so that other pictures containing such outlines can be further associated. In one embodiment, the photos are searchable by pixel coordination in addition to category, comments, and other metadata.

In an embodiment, a system enables a user to utilize user registration, login into the system, send an email or communication to someone outside the system, view associated photos, perform a keyword based search of photos, import photos and metadata from third party repository, delete a photo from user's collection of photos, mass upload photos from user file-system, view photos, embed information in a photo, and add a comment into a photo. Of the above functions, an application agent may be utilized to view associated photos. A search agent may be utilized to perform a keyword based search of photos, and an XML parser to import photos from third party repository.

The applicable functions are implemented through each module. By assigning functions to separate modules, the system may be designed to have improved efficiency and troubleshooting abilities. In a User Management Module, the user may interact with the system through user registration, system login, and email management with users external to the system. The User Management Module specifically governs a user's profile and interaction with external users. This module dictates a user's access to the photos in the system and controls a user's interaction with outside resources. In one embodiment, the User Management Module enables a user to set limit on photo access to maintain data accuracy and consistency. In one further embodiment, the User Management Module allows a user to invite a non-user of the system to view a photo and its associated metadata. In an embodiment, the User Management Module allows users to add each other as friends or groups to enhance the social media value of the present system.

An Embed Information Module enables a user to interact with the system by viewing a photo stored in the database, embed information in a photo, and adding comments to such a photo. The Embed Information Module governs the interaction between users and the metadata attached to the photos. Through this module, a photo may be transformed from a simple image with a single filename into a complex entity with potential for countless data associations. By imbuing photos with additional data points, a photo transforms beyond being an image into being a nexus for an abundance of information. In one embodiment, the Embed Information Module enables a user to use voice to text technology for embedding information in photos. In further embodiments, the Embed Information Module may add predicative texts to similar fields based on similar photos. In one embodiment, the regions in a photo can be organized based on the similarity of their region coordinates. In an embodiment, the photo management system will be organized based on actual shapes of certain objects in the photos.

An Upload Module enables a user to interact with the system by importing photos and metadata from third party repository, deleting a photo from user's collection of photos, and mass uploading from a user file-system. This module governs submitting photos from a user's device to the storage component of the present system. In one embodiment, a photo, after being uploaded, may be scanned for any potential metadata. Thus, a photo may be not just an image, but a nexus of relevant information connected to the image. In an embodiment, third party user file system can be linked so a user can upload pre-stored photos from third party repositories.

A Search Module enables a user to view associated photos and to perform a keyword based search of photos. Because the photos are now associated with a plethora of categories, based either on the entire photo or regions of the photo, there will be an increased amount of result compared to a traditional database. In an embodiment, the Search Module will be able to organize the search results so that the most pertinent results will be the most visible. In an embodiment, multiple search criteria can be combined to pinpoint a particular photo. In one further embodiment, the Search Module allows photos to be displayed on a third party photo viewer, external to the present system.

In one embodiment, the Search Module enables a user to grade photos based on their relevancy to the search. This allows a better organization of the search results, so that a user may have an easier time parse through the results. In one further embodiment, the Search Module may employ search agents that can be scheduled to run automatically and notify users of updates to the changes.

All the modules discussed herein work together to form a coherent system and allow for seamless integration of metadata and photos to provide a comprehensive index system, which offers unlimited relatability and search-ability for all users. In one embodiment, the photo management system may be integrated with social media websites such as FACEBOOK, INSTAGRAM, TWITTER, LINKEDIN, or other alumni relation websites to provide an expanded user community. This expanded user community can be utilized to unlock information in a plethora of photos so that the images become connected ports of information akin to entries in an encyclopedia. In one embodiment, the present system is provided to create a web of information based on images and their associated regions. A picture in the present photo management system will be worth more than thousand words, and these words will come in the form of tangible connectivity among users in the community.

An embodiment may be used to provide back-end functionality to support multiple front-ends for different vertical markets. For example, multiple organizations or business entities could rely on a single backend system for front-end content support. An embodiment may be used by different schools to create an interactive photo archive. Each school would have their individual photo archive that can be shared and accessed by its own alumni network, but a backend system support will be provided on a single platform to ensure congruency of data in various front ends.

By way of example, some or all the images, e.g., displayed on a web interface page, would be denoted with a symbol to indicate the accessibility to augmented image system. These images would have been enabled for annotation by the system so that the user would understand the possibility of functions associated with each photo. The photos associated with the augmented image system would provide a variety of interactive functions to the user that would be unavailable on other systems.

Once a user selects a photo of interest, a field of information may be presented, e.g., via pop up window next to the photo. This field of information contains content that are beyond simple identifying file names normally associated with a photo. A photo enabled by the augmented image system will have a depth of metadata that provides detailed information about the photo. For example, a date of the photo is displayed; however, such a date is not the date of upload, digitization, or last edition that would normally be associated with a photo in other systems. Rather, such a date is a part of the metadata that actually reflects the date that such a photo is taken. This allows a user to search for the photo accurately in the present system. In an embodiment, a user may browse through photos in the database by searching with parameters such as this.

In an embodiment, a user may also perform photo viewing functions such as zooming in to better view the selected photo. The user would also be given the option to login to help annotating the photo with any information that he/she has knowledge of.

For example, a user may be logged in and modify the annotation metadata, e.g., the location of a photo, e.g., to "Cathedral Lawn." As such, another user searching for an event that took place at "Cathedral Lawn" would be able to locate this photo by searching through the database. Because the person uploading the photo may not associate the photo with "Cathedral Lawn", the present system provides the ability to associate the photo via annotation so that such information can be associated with the image. Further, a user may choose to highlight a region of the photo to provide further information. An embodiment associates as much information as possible with a variety of objects in the photo, so that a network of information can be connected between images according to various objects. In addition, a user may choose to view regions in the photo that have been populated with annotation by other users. For example, if a hot air balloon is highlighted by region, a user may select to view it.

Selecting the region, e.g., hot air balloon, yields a new field of information. This new field of information contains additional information about the selected hot air balloon. The augmented image system does not limit photo annotation to just people tagging. Rather, the present system is designed to provide detailed information about anything and everything in a region of the photo, so that users may find other photos or information by looking through the annotated content in the field of information. For example, information regarding the hot air balloon may include but is not limited to: name of the owner, flight plan, number or identify of the passengers, identity of pilots, license information, manufacturer, and years in search. All this information may be known by a number of different users, and the system would rely on the community of users to provide accurate information regarding the selected object. This provides a peer-reviewed content supply system to accurately annotate the selected object. Further, the hot air balloon as annotated would be linked to other photos that may contain this particular hot air balloon, down to the detail such as model and made, and a user may find other photos that contain such a hot air balloon by accessing a "Find Elsewhere" link or like interface element.

Multiple regions of the photo can be identified and annotated. For example, a building may be identified by region and a displayed field of information is changed to reflect the newly selected area. A variety of parameters may be associated with the selected region, and the parameters will be displayed in the field of information. Such parameters may include but are not limited to: name of the structure, data of construction, date of destruction if available, resident list, and resident adviser list. This level of detail available to such a region would allow the image to be embedded with a wealth of information that is simply unavailable in other existing image systems. Similar to the case of the hot air balloon, the highlighted building can be related to other photos that contain the same parameters, and a user may navigate to those photos by browsing the related photos. For example, another photo taken during the event in the same area may be selected, and a field of information is displayed to identify the photo in detail. The general information regarding the photo is provided. Because the photos selected were taken during the same event and at the same time, in an embodiment, the field of information displays the same basic information regarding the photo as a whole.

Further, a person may be identified by having a region outlined around this person. The region identifies the person, and the field of information would indicate detailed information about the person, as provided by the users of the system. Because this person is identified by another user, the user viewing this photo may choose to view more detailed information about the photo, as long as such contents are supplied by other users and are available to the current user.

It is important to note that every parameter listed in the fields of information may be hyperlinked to a related page, e.g., a link or call to a server to related data such as video, image or text data. This way, the field of information is not just a passive display of information. Rather, the field of information provides the user a way to learn more about contents associated with each parameter. In this case, a user may choose to click on the name of the tagged person to find out more about her. If a person chooses to find out more about the selected person, the user may be taken to a page dedicated to the person identified in the photo.

It will be appreciated that a variety of devices may be used in connection with implementing the various embodiments. An example computing system is illustrated in FIG. 18 in the form of a computer 1810, which may be used in a networked environment to communicate with remote devices 1870, and which may be used to implement many of the functions that have been described herein. Components of the example computer 1810 include, but are not limited to, a processing unit 1820, a system memory 1830, and a system bus 1822 that couples various system components including the system memory 1830 to the processing unit 1820. The computer 1810 may include or have access to a variety of computer readable media. The system memory 1830 may include computer readable storage media in the form of volatile and/or nonvolatile memory such as read only memory (ROM) and/or random access memory (RAM). By way of example, and not limitation, system memory 1830 may also include an operating system, application programs such as image management software, other program modules, and program data.

A user can interface with (for example, enter commands and information) the computer 1810 through input interface(s) 1840. A monitor or other type of device can also be connected to the system bus 1822 via an interface, such as an output interface 1850. In addition, computers may also include other peripheral input or output devices, physically integrated, or connected via a network interface 1860, for example. The computer 1810 may operate in a networked or distributed environment using logical connections to one or more other remote devices 1870 including, but not limited to, computers or databases. The logical connections may include a network, such local area network (LAN) or a wide area network (WAN), but may also include other networks/buses.

Aspects are described herein with reference to illustrations and/or block diagrams of methods, apparatuses (systems) and computer program products (non-transitory media storing executable code) according to example embodiments. It will be understood that elements of the illustrations and/or block diagrams, and combinations thereof, can be implemented by computer program instructions. These computer program instructions may be provided to a processor of a computer or other programmable data processing apparatus to produce a machine, such that the instructions, which execute via the processor of the computer or other programmable data processing apparatus, create means for implementing the functions/acts specified in the flowchart and/or block diagram block or blocks.

As will be appreciated by one skilled in the art, embodiments may be implemented as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied therewith.

Any combination of one or more computer readable medium(s) may be utilized. The computer readable medium may be a non-transitory computer readable storage medium, for example, but not limited to, an electronic, magnetic, optical, electromagnetic, infrared, or semiconductor system, apparatus, or device, or any suitable combination of the foregoing. More specific examples (a non-exhaustive list) of a non-transitory computer readable storage medium include an electrical connection having one or more wires, a portable computer diskette, a hard disk, a random-access memory (RAM), a read-only memory (ROM), an erasable programmable read-only memory (EPROM or Flash memory), volatile memory, non-volatile storage, or any suitable combination of the foregoing.

Computer program code for carrying out operations for various embodiments may be written in any combination of one or more programming languages, including an object-oriented programming language such as JAVA, Smalltalk, C++ or the like and conventional procedural programming languages, such as the "C" programming language or similar programming languages. The program code may execute entirely on a single computer (device), partly on a single computer, as a stand-alone software package, partly on single computer and partly on a remote computer, or entirely on a remote computer or server. In the latter scenario, the remote computer may be connected to another computer through any type of network, including a local area network (LAN) or a wide area network (WAN), or the connection may be made for example through the Internet using an Internet Service Provider.

Although illustrated example embodiments have been described herein with reference to the accompanying drawings, it is to be understood that embodiments are not limited to those precise example embodiments, and that various other changes and modifications may be affected therein by one skilled in the art without departing from the scope or spirit of the disclosure.

What is claimed is:

1. A method, comprising:
    receiving, from a device, user metadata indicative of one or more identifying characteristics of a user;
    accessing, in a storage device, a dataset ordering a time series of images and instructions according to a script based on the user metadata;
    wherein each of the time series of images is associated with first data produced by first free-form user input specifying one or more regions of a respective image and second data comprising second free-form user input describing the one or more regions of the respective image; and
    providing, using a processor, the dataset according to the script;
    wherein:
    the script comprises a training script configuring each image in the time series of images and respective first and second free-form user inputs selected based on the user metadata, arranged according to the instructions for a process to be followed by a user associated with the user metadata; and
    the second data comprise technical data related to an object displayed in the one or more regions of the respective image.

2. The method of claim 1, wherein the providing comprises providing, to a plurality of remote devices, respective, different datasets for display in a collaborative session, each of the respective, different datasets being identified based on respective user metadata.

3. The method of claim 1, wherein:
    the first free-form user input designates a group of pixels of the respective image; and
    the second free-form user input comprises one or more of alphanumeric input, audio input, and image input.

4. The method of claim 1, comprising receiving, from the device, one or more of the first data, the second data and the image data.

5. The method of claim 1, wherein the user metadata is selected from a user name, a role, and a domain.

6. The method of claim 1, comprising:
    receiving a second user identification; and
    selecting a second dataset based on the second user identification;
    wherein the second dataset is different than the dataset.

7. The method of claim 1, comprising:
    receiving a search query;
    identifying, using a processor, a first image based on at least the second data; and
    providing a query result comprising the first image.

8. The method of claim 7, comprising:
    relating one or more terms included in the second data to one or more other terms;
    wherein the identifying comprises using the one or more other terms to provide the query result.

9. The method of claim 1, comprising receiving data indicating a scene;
wherein the accessing is based at least in part on the data indicating the scene; and
wherein the providing comprises providing the dataset for inclusion in an augmented reality display.

10. The method of claim 1, comprising creating one or more database attributes for the second data in association with obtaining the first data.

11. The method of claim 1, wherein:
the instructions comprise an instruction to capture an image of a first object according to the script; and
the method comprises:
storing the image of the first object in association with the user metadata; and
indicating, to a second user, that the image of the first object is stored as an auding image.

12. A method, comprising:
obtaining an image captured with a camera of a user device;
storing first data, produced by first free-form user input received from the user device specifying one or more regions of the image, and second free-form user input received from the user device, describing the one or more regions of the image, in association with one another;
storing additional data received from the user device in a dataset ordering the image in a time series of images according to a script and comprising a series of instructions related to the one or more regions of the image;
storing an association between user metadata indicative of one or more identifying characteristics of a user and the dataset; and
using the association to thereafter select the dataset in response to a request, that includes the user metadata, to provide the dataset according to the script;
wherein:
the script comprises a training script configuring each image in the time series of images and respective first and second free-form user inputs selected based on the user metadata, arranged according to the series of instructions for a process to be followed by a user associated with the user metadata; and
the second free-form user input comprise technical data related to an object displayed in the one or more regions of the image.

13. The method of claim 12, wherein the user metadata is selected from a user name, a role, and a domain.

14. The method of claim 12, wherein the association comprises a plurality of associations between a plurality of user metadata and a plurality of datasets.

15. A system, comprising:
a processor;
a storage device operatively coupled to the processor; and
code stored in the storage device and executable by the processor, the code comprising:
code that obtains an image captured with a camera of a first user device;
code that stores first data, produced by first free-form user input received from the first user device specifying one or more regions of the image, and second free-form user input received from the first user device, describing the one or more regions of the image, in association with one another;
code that stores additional data received from the first user device in a dataset ordering the image in a time series of images according to a script and comprising a series of instructions related to the one or more regions of the image;
code that stores an association between user metadata indicative of one or more identifying characteristics of a user and the dataset; and
code that uses the association to thereafter select the dataset in response to a request that includes the user metadata to provide the dataset according to the script;
wherein:
the script comprises a training script configuring each image in the time series of images and respective first and second free-form user inputs selected based on the user metadata, arranged according to the series of instructions for a process to be followed by a user associated with the user metadata; and
the second free-form user input comprise technical data related to an object displayed in the one or more regions of the image.

* * * * *